US012586274B2

(12) United States Patent
Duan et al.

(10) Patent No.: US 12,586,274 B2
(45) Date of Patent: Mar. 24, 2026

(54) SCROLLING SCREENSHOT METHOD AND APPARATUS

(71) Applicant: Huawei Technologies Co., Ltd., Shenzhen (CN)

(72) Inventors: Yun Duan, Wuhan (CN); Hua Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 18/574,916

(22) PCT Filed: Jun. 25, 2022

(86) PCT No.: PCT/CN2022/101346
§ 371 (c)(1),
(2) Date: Dec. 28, 2023

(87) PCT Pub. No.: WO2023/274093
PCT Pub. Date: Jan. 5, 2023

(65) Prior Publication Data
US 2024/0320887 A1 Sep. 26, 2024

(30) Foreign Application Priority Data

Jun. 30, 2021 (CN) .......................... 202110740402.5

(51) Int. Cl.
*G06T 11/60* (2006.01)
*G06F 3/0485* (2022.01)

(52) U.S. Cl.
CPC ............ *G06T 11/60* (2013.01); *G06F 3/0485* (2013.01); *G06T 2200/24* (2013.01)

(58) Field of Classification Search
CPC ....................................................... G06T 11/60
(Continued)

(56) References Cited

U.S. PATENT DOCUMENTS 9,076,231 B1 * 7/2015 Hill .......................... G06F 21/84
12,073,057 B2 * 8/2024 Wang .................. G06F 3/04883
(Continued)

FOREIGN PATENT DOCUMENTS

CN 106843700 A * 6/2017 .......... G06F 3/0485
CN 108628523 A 10/2018
(Continued)

OTHER PUBLICATIONS

Getting Started Guide,Feb. 9, 2013, URL:https://www.youtube.com/watch?v=pIB0SmliDIM, total 20 pages.

*Primary Examiner* — Reza Nabi
(74) *Attorney, Agent, or Firm* — Slater Matsil, LLP

(57) ABSTRACT
A scrolling screenshot method and an apparatus, the method including displaying, by an electronic device, a first interface that displays a first part of a first page, receiving, by the electronic device, a first input, capturing the first part of the first page in response to the first input, scrolling, by the electronic device in a first direction for display, and capturing a second part of the first page, where the first part is adjacent to the second part, scrolling, after the electronic device captures the second part, by the electronic device, in a second direction, for display, and capturing a third part of the first page, where the second direction is different from the first direction, determining that a first condition is met. and synthesizing a target screenshot image in response, where the target screenshot image comprises the first part, the second part, and the third part.

17 Claims, 32 Drawing Sheets

(58) Field of Classification Search
USPC ......................................................... 715/784
See application file for complete search history.

(56)                         References Cited

U.S. PATENT DOCUMENTS

| | | | | |
|---|---|---|---|---|
| 2014/0022269 A1* | 1/2014 | Zheng | ......................... | G06F 3/14 |
| | | | | 345/545 |
| 2016/0092180 A1* | 3/2016 | Straub | ..................... | G06T 11/60 |
| | | | | 715/762 |
| 2016/0266757 A1* | 9/2016 | Ye | ............................ | G06F 3/048 |
| 2017/0017648 A1* | 1/2017 | Pearlman | .............. | G06F 16/583 |
| 2017/0308285 A1* | 10/2017 | Liu | ........................ | G06F 3/0488 |
| 2018/0081744 A1* | 3/2018 | Chen | ........................ | G06F 9/451 |
| 2020/0322689 A1* | 10/2020 | Gao | ................. | H04N 21/47815 |
| 2021/0072880 A1* | 3/2021 | Mathur | ................. | G06F 3/0485 |
| 2021/0286491 A1* | 9/2021 | Duan | .................. | G06F 3/04845 |
| 2022/0050565 A1* | 2/2022 | Yi | ........................ | G06F 3/04842 |
| 2022/0214802 A1* | 7/2022 | Xiong | ................... | G06F 21/629 |
| 2022/0317841 A1* | 10/2022 | Zheng | ................... | G06F 3/0484 |
| 2022/0413787 A1* | 12/2022 | Yu | ............................ | G06T 15/20 |
| 2024/0211378 A1* | 6/2024 | Wartanowicz | ...... | G06F 11/3698 |
| 2024/0320887 A1* | 9/2024 | Duan | ................... | G06F 3/0483 |
| 2024/0371058 A1* | 11/2024 | Duan | ..................... | G06T 11/60 |

FOREIGN PATENT DOCUMENTS

| | | | | | |
|---|---|---|---|---|---|
| CN | 108629731 A | * | 10/2018 | .......... | G06T 3/4038 |
| CN | 108984091 A | | 12/2018 | | |
| CN | 109358791 A | * | 2/2019 | ........ | G06F 3/04845 |
| CN | 110908554 A | | 3/2020 | | |

* cited by examiner

331

320

321

311

341

331

320

321

342

311

331

320

321

Scrolling screenshot is performed now.
Tap to complete the screenshot

Po

343

311

Po

331

320

321

344

311

331

Scrolling screenshot is performed now.
Tap to complete the screenshot

320

321

Position 5

345

311 ition 6

331

Scrolling screenshot is performed now.
Tap to complete the screenshot

320

321 sition 9

346

311

Po

331

Scrolling screenshot is
performed now.
Tap to complete the screenshot

320

321

360

311

333

Splicing is performed now

320

321

361

313

CONT.
FROM
FIG. 4I-1
~

| ID number | Name | Hobby | | |
|-----------|------|-------|--|--|
| 00001 | Alice | Singing | | |
| 00002 | Ann | Dancing | | |
| 00003 | Ayden | Reading | | |
| 00004 | Brody | Running | | |
| 00005 | Brisa | Game | | |
| 00006 | Blair | Singing | | |
| 00007 | Davis | Dancing | | |
| 00008 | Darin | Reading | | |
| 00009 | Lucia | Running | | |
| 00010 | Luz | Game | | |
| 00011 | Liza | Singing | | |
| 00012 | Nancy | Dancing | | |
| 00013 | Norah | Reading | | |
| 00014 | Zoey | Running | | |
| | | | | |

CONT.
FROM
FIG. 4I-1
~

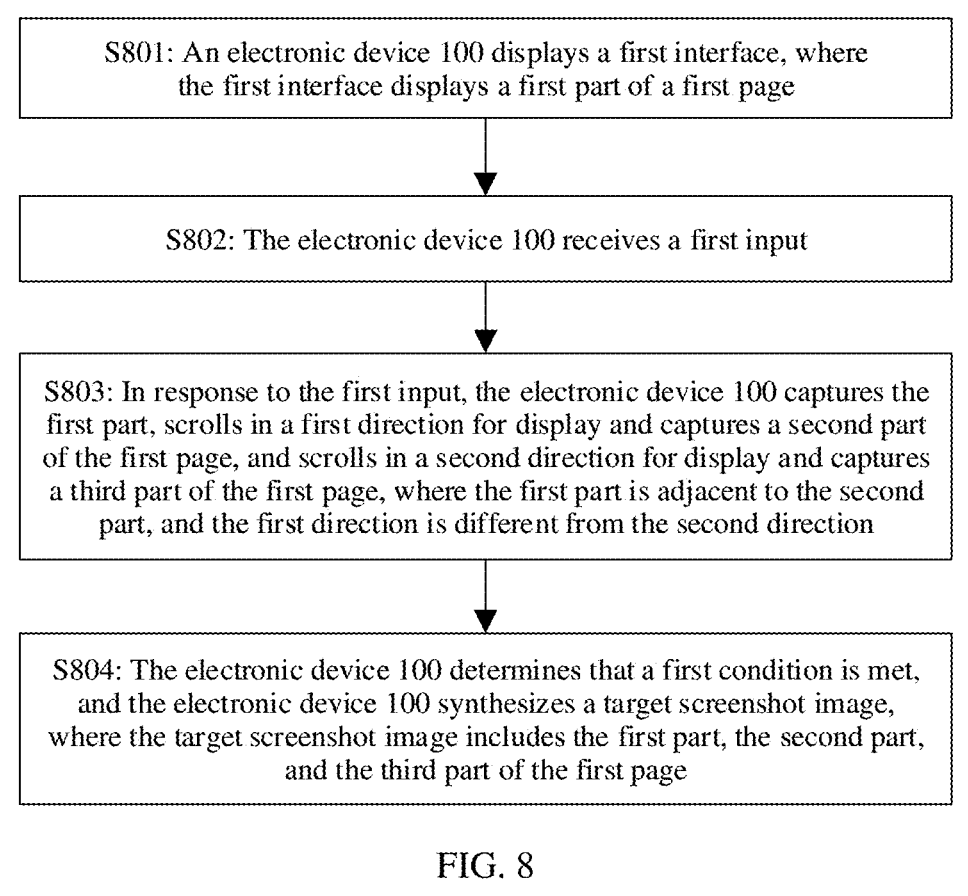

S801: An electronic device 100 displays a first interface, where the first interface displays a first part of a first page

↓

S802: The electronic device 100 receives a first input

↓

S803: In response to the first input, the electronic device 100 captures the first part, scrolls in a first direction for display and captures a second part of the first page, and scrolls in a second direction for display and captures a third part of the first page, where the first part is adjacent to the second part, and the first direction is different from the second direction

↓

S804: The electronic device 100 determines that a first condition is met, and the electronic device 100 synthesizes a target screenshot image, where the target screenshot image includes the first part, the second part, and the third part of the first page

FIG. 8

SCROLLING SCREENSHOT METHOD AND APPARATUS

CROSS REFERENCE TO RELATED APPLICATIONS

This application is a national stage of International Application No. PCT/CN2022/101346, filed on Jun. 25, 2022, which claims priority to Chinese Patent Application No. 202110740402.5, filed on Jun. 30, 2021. Both of the aforementioned applications are hereby incorporated by reference in their entireties.

TECHNICAL FIELD

This application relates to the terminal field, and in particular, to a scrolling screenshot method and an apparatus.

BACKGROUND

Currently, most electronic devices provide a scrolling screenshot function, and a user may obtain a screenshot image of a current display interface of the electronic device by using the function. However, the electronic device can scroll in only one direction and obtain the screenshot image. If a display interface of the electronic device may scroll in a plurality of directions (for example, an interface of a map or a table may scroll leftward, rightward, upward, or downward), the electronic device can obtain only a screenshot image that scrolls in one direction.

SUMMARY

This application provides a scrolling screenshot method and a related apparatus, so that an electronic device may sequentially move a position of a specified page in a scrolling window in a plurality of directions based on a preset trajectory direction, and capture displayed content in the scrolling window, to obtain a plurality of partitioned screenshot images. The electronic device may splice the plurality of partitioned screenshot images, to obtain a target screenshot image. In this way, the electronic device 100 may scroll different parts of a first page in the plurality of directions for display, and obtain a target screenshot image including the different parts of the first page.

According to a first aspect, this application provides a scrolling screenshot method. The method includes: An electronic device displays a first interface, where the first interface displays a first part of a first page. The electronic device receives a first input. The electronic device captures the first part of the first page in response to the first input. The electronic device scrolls in a first direction for display, and captures a second part of the first page. The first part is adjacent to the second part. After the electronic device captures the second part, the electronic device scrolls in a second direction for display, and captures a third part of the first page. The second direction is different from the first direction. The electronic device determines that a first condition is met, and synthesizes a target screenshot image. The target screenshot image includes the first part, the second part, and the third part.

According to the scrolling screenshot method provided in this application, when displaying a multi-directional interface, the electronic device may sequentially move a position of a specified page in a scrolling window in a plurality of directions based on a preset trajectory direction, and capture displayed content in the scrolling window, to obtain a plurality of partitioned screenshot images. The electronic device may splice the plurality of partitioned screenshot images, to obtain a target screenshot image. In this way, the electronic device may scroll in the plurality of directions, to capture the image of the specified page displayed on a screen.

In a possible implementation, the first condition includes: The electronic device receives an operation of stopping screen capturing. In this case, the electronic device 100 may obtain the target screenshot image that includes all content required by a user.

In a possible implementation, the first condition includes: A quantity of times of screen capturing by the electronic device is greater than or equal to a preset quantity of times. In this case, the electronic device 100 may automatically stop a screen capture operation without a user operation when the preset quantity of times is reached, to obtain the target screenshot image.

In a possible implementation, the first condition includes: The electronic device currently displays a corner area of the first page in the scrolling window, and a part that has been captured by the electronic device on the first page includes a surrounding part of the corner area. In this case, the electronic device 100 may stop a screen capture operation in the corner area, to prevent the electronic device 100 from freezing in the corner area or from repeatedly capturing a captured area.

In a possible implementation, before the electronic device determines that a first condition is met, the method further includes: The electronic device scrolls a fourth part of the first page in a third direction for display. The first condition includes: The electronic device determines that the fourth part of the first page does not include valid content. In this case, the electronic device 100 may obtain the target screenshot image that includes the valid content of the first page.

In a possible implementation, the first condition includes: The electronic device determines that a plurality of captured parts of the first page completely cover a specified area. The plurality of parts of the first page include the first part, the second part, and the third part. The specified area is a smallest rectangular area that has a regular edge and includes the plurality of parts of the first page that have been captured by the electronic device. In this case, the electronic device 100 may obtain the smallest rectangular target screenshot image with a regular edge.

According to a second aspect, this application provides an electronic device, including one or more processors, a display, and one or more memories. The display and the one or more memories are coupled to the one or more processors. The one or more memories are configured to store computer program code, and the computer program code includes computer instructions. When the one or more processors execute the computer instructions, the electronic device is enabled to perform the scrolling screenshot method in any possible implementation of any one of the foregoing aspects.

According to a third aspect, an embodiment of this application provides a computer-readable storage medium, including computer instructions. When the computer instructions are run on an electronic device provided in this application, the electronic device is enabled to perform the scrolling screenshot method in any possible implementation of any one of the foregoing aspects.

According to a fourth aspect, an embodiment of this application provides a computer program product. When the computer program product runs on the foregoing electronic device, the electronic device is enabled to perform the scrolling screenshot method in any possible implementation of any one of the foregoing aspects.

BRIEF DESCRIPTION OF THE DRAWINGS

FIG. 8 is a schematic flowchart of a scrolling screenshot method according to an embodiment of this application.

DETAILED DESCRIPTION OF ILLUSTRATIVE EMBODIMENTS

The technical solutions according to embodiments of this application are clearly described in the following with reference to the accompanying drawings. In the descriptions of embodiments of this application, unless otherwise specified, "/" indicates "or". For example, A/B may indicate A or B. The term "and/or" in this specification only describes an association relationship for describing associated objects, and indicates that three relationships may exist. For example, A and/or B may indicate the following three cases: Only A exists, both A and B exist, and only B exists.

The following terms "first" and "second" are only intended for a purpose of description, and should not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

An embodiment of this application provides a scrolling screenshot method. The electronic device may display a multi-directional interface. The multi-directional interface includes a scrolling window and a specified page. The scrolling window displays only a part of the specified page each time. The specified page may move in a plurality of directions (for example, left/right/up/down) in the scrolling window. After receiving a first input, the electronic device may sequentially move, in response to the first input, a position of the specified page in the scrolling window in the plurality of directions based on a preset trajectory direction, and capture displayed content in the scrolling window, to obtain a plurality of partitioned screenshot images. The electronic device may splice the plurality of partitioned screenshot images, to obtain a target screenshot image. In this way, the electronic device may scroll in the plurality of directions, to capture the image of the specified page displayed on a screen.

The following describes the electronic device provided in an embodiment of this application.

The electronic device 100 may be a mobile phone, a tablet computer, a desktop computer, a laptop computer, a hand-held computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart household device, and/or a smart city device. A specific type of the electronic device is not limited in this embodiment of this application.

Figure 1A:
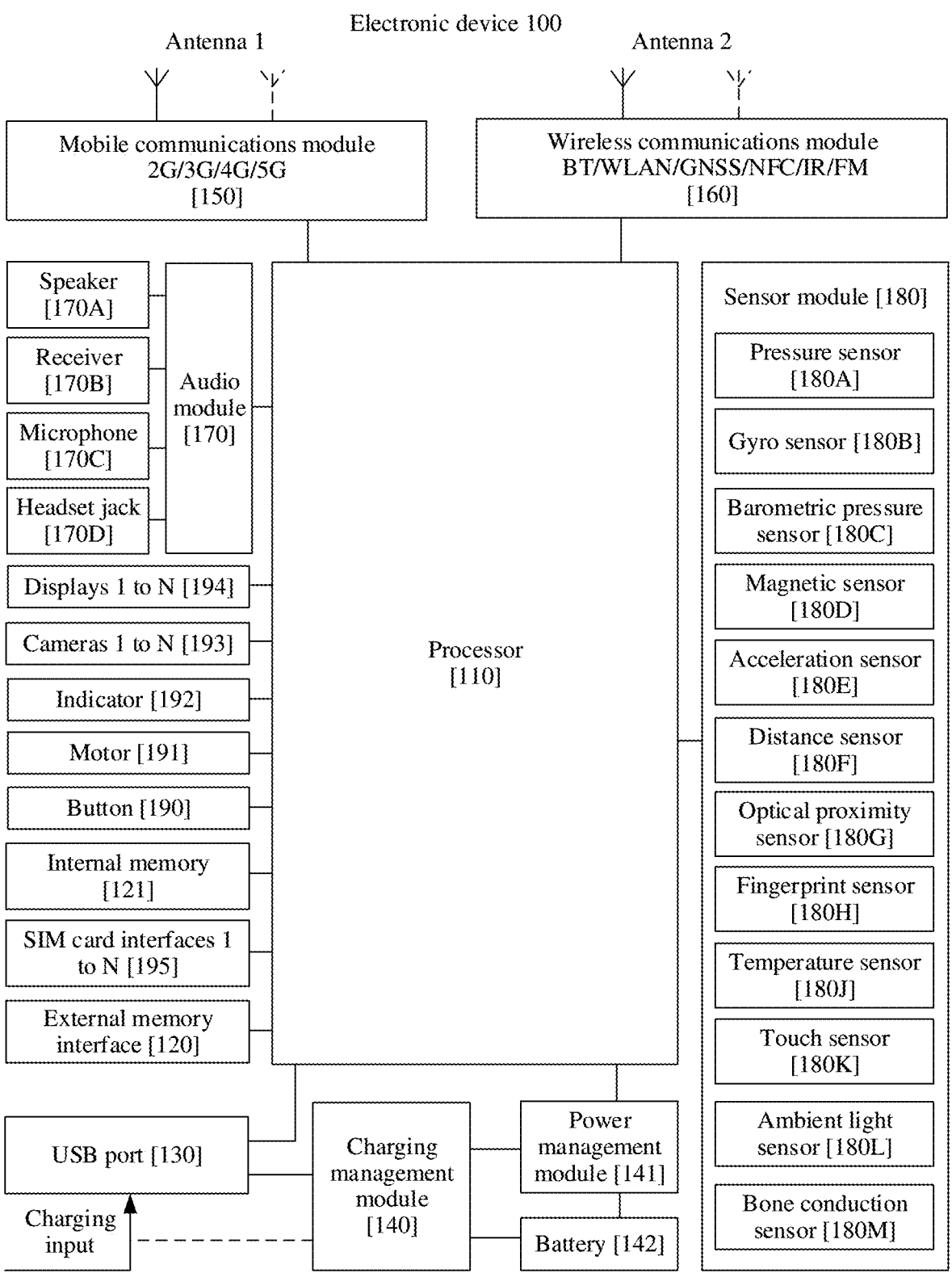
FIG. 1A is a schematic diagram of a structure of an electronic device 100 according to an embodiment of this application.

FIG. 1A is a schematic diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or a different component arrangement may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

It may be understood that an interface connection relationship between the modules that is shown in this embodiment of the present invention is only an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input by using a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution applied to the electronic device 100 for wireless communications such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another functional module.

The wireless communications module 160 may provide a wireless communications solution that is applied to the electronic device 100, and that includes a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194. N is a positive integer greater than 1.

The electronic device 100 may implement a photographing function through the camera 193, the ISP, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD), or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193. N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more types of video codecs. In this case, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transmission mode between human brain neurons, and may further continuously perform self-learning. The NPU may implement applications such as intelligent cognition of the electronic device 100, for example, image recognition, facial recognition, speech recognition, and text understanding.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and videos are stored in the external non-volatile memory.

The internal memory 121 may be configured to store computer-executable program code, and the executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a sound playing function or an image playing function), and the like. The data storage area may store data (for example, audio data and a phone book) and the like created when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into analog audio signal output, and is further configured to convert analog audio input into a digital audio signal.

The speaker 170A, also referred to as a "loudspeaker", is configured to convert an audio electrical signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the electronic device 100. The barometric pressure sensor 180C is configured to measure barometric pressure. The magnetic sensor 180D includes a Hall effect sensor. Opening and closing of a flip leather case may be detected by using the magnetic sensor 180D. The acceleration sensor 180E may detect accelerations in various directions (usually on three axes) of the electronic device 100. The distance sensor 180F is configured to measure a distance. The optical proximity sensor 180G may also be used in a leather case mode or a pocket mode to automatically unlock or lock the screen. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided on the display 894. In some other embodiments, the touch sensor 180K may alternatively be disposed on a surface of the electronic device 100 at a position different from a position of the display 194. The bone conduction sensor 180M may obtain a vibration signal. The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

The internal memory 121 may store a preset trajectory direction. The processor 110 may sequentially move a position of a specified page in a scrolling window in a plurality of directions based on a preset trajectory direction, and capture displayed content in the scrolling window.

The processor 110 may perform scrolling screenshot, splicing, and display operations based on a first input of a user.

The display 194 may be configured to display a scrolling screenshot interface, and the display 194 may be further configured to display a target screenshot image.

The touch sensor 180K may be configured to detect a touch operation performed on or near the touch sensor. The touch sensor may transfer the detected touch operation to the processor 110 to determine a type of a touch event. After determining that the touch operation is the first input, the processor 110 may perform an operation of starting scrolling screenshot.

The following describes a schematic diagram of a software structure of an electronic device 100 according to an embodiment of this application.

A software system of the electronic device 100 may use a layered architecture, an event-driven architecture, a micro-kernel architecture, a micro service architecture, or a cloud architecture. In this embodiment of the present invention, an Android system with a layered architecture is used as an example to illustrate the software structure of the electronic device 100.

Figure 1B:
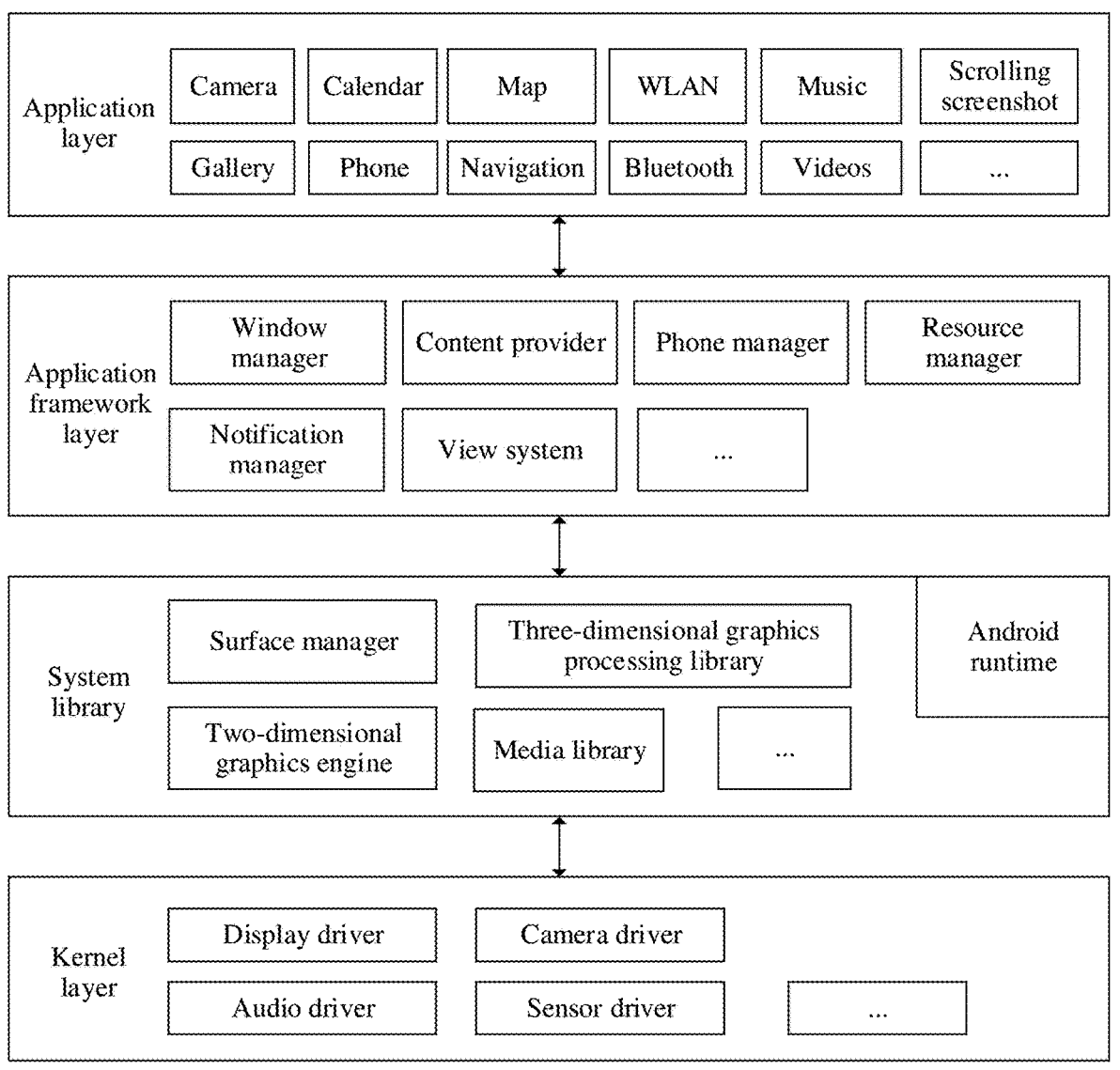
FIG. 1B is a block diagram of a software structure of an electronic device 100 according to an embodiment of this application.

FIG. 1B is a block diagram of the software structure of the electronic device 100 according to an embodiment of the present invention.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and a system library, and a kernel layer from top to bottom.

The application layer may include a series of application packages.

As shown in FIG. 1B, the application packages may include applications such as Camera, Gallery, Calendar, Phone, Map, Navigation, WLAN, Bluetooth, Music, Videos, and Scrolling Screenshot.

The Scrolling Screenshot application may call some general interface functions, sequentially scroll a plurality of parts of a specified page for display in a scrolling window based on a preset trajectory direction, and sequentially capture the plurality of parts displayed in the scrolling window, to obtain a plurality of partitioned screenshot images. The Scrolling Screenshot application may further splice the plurality of screenshot images, to obtain a target screenshot image. The Scrolling Screenshot application may generate one interface that displays the target screenshot image, and the interface includes a plurality of controls used to edit the target screenshot image.

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage window programs. The window manager may obtain a size of a display, determine whether there is a status bar, lock a screen, capture a screen, and the like.

The content providers are configured to store and retrieve data and make the data accessible to applications. The data may include videos, images, audio, calls made and received, browsing history and bookmarks, a phone book, and the like.

The view system includes visual controls, such as a control for displaying text, a control for displaying pictures, and the like. The view system may be configured to build an application. A display interface may be composed of one or more views. For example, a display interface including a short message service message notification icon may include a view for displaying text and a view for displaying a picture.

The phone manager is used to provide a communications function of the electronic device 100, for example, management of a call status (including answering, declining, or the like).

The resource manager provides, to the application, various resources such as a localized character string, an icon, a picture, a layout file, and a video file.

The notification manager enables the application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running in the background or a notification that appears on the screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and managing an Android system.

The kernel library includes two parts: a function to be invoked by a Java language, and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (media library), a three-dimensional graphics processing library (for example, an OpenGL ES), and a 2D graphics engine (for example, an SGL).

The surface manager is configured to manage a display subsystem and provides the merging of 2D and 3D layers for a plurality of applications.

The media library supports playback and recording of various common audio and video formats, as well as still image files, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to an application scenario, the following specifically describes a scrolling screenshot method provided in an embodiment of this application.

Figure 2:
FIG. 2 is a schematic diagram of an interface according to an embodiment of this application.

To better describe an interface diagram provided in this embodiment of this application, the following uses a map application interface as an example with reference to FIG. 2, to describe an interface element layout of a multi-directional interface.

For example, the multi-directional interface may be the map application interface 200 shown in FIG. 2. The map application interface 200 may include but is not limited to a page element 201 and a scrolling window 211. The scrolling window 211 may display a part of content of a page 221. A map may be displayed on the page 221. An electronic device 100 may receive an input operation (for example, sliding the page 221) of a user, and display content of different parts of the page 221 in the scrolling window 211. It should be noted that, the page 221 shown in the figure is only an example. In actual application, the page 221 may alternatively be a page that scrolls in a plurality of directions and has no boundary, for example, a real-time map or a table.

The page element 201 may include all interface elements in a display area other than the scrolling window. In the map application interface 200 shown in FIG. 2, the page element 201 may include but is not limited to a top status bar and the like. The top status bar may include but is not limited to a network signal identifier icon, a time identifier icon, and the like. Optionally, the page element 201 may further include a search bar. The search bar can be used to search for a specific position on the map.

FIG. 2 further indicates relative positions of an upper side, a lower side, a left side, and a right side of the map application interface 200. These positions may be used to describe a position on a touchscreen of the electronic device 100 or a position on a display interface of the electronic device 100. For example, in the map application interface 200, the page element 201 is located on the upper side of the map application interface 200. In addition, downward may mean a direction from the upper side to the lower side of the map application interface 200, upward may mean a direction from the lower side to the upper side of the map application interface 200, rightward may mean a direction from the left side to the right side of the map application interface 200, and leftward may mean a direction from the right side to the left side of the map application interface 200. The descriptions of the positions are further applicable to the descriptions of the following accompanying drawings.

In some application scenarios, when capturing a screenshot of a multi-directional interface by using the Scrolling Screenshot application, the electronic device 100 may obtain a target screenshot image that includes a part of content of a specified page in a current interface that is not displayed on a display. In response to a received first input (for example, drawing a specified pattern on the interface by using a knuckle), the electronic device 100 may sequentially scroll a plurality of parts of a specified page for display in a scrolling window based on a preset trajectory direction, and sequentially capture the plurality of parts displayed in the scrolling window, to obtain a plurality of partitioned screenshot images. In response to a second input of the user (that is, stopping a screen capture operation, for example, tapping), the electronic device 100 may stop scrolling and capturing displayed content in the scrolling window. The electronic device 100 may splice the plurality of partitioned screenshot images based on the preset trajectory direction, to obtain the target screenshot image. Content of the target screenshot image includes all content of all obtained partitioned screenshot images. The preset trajectory direction includes at least two non-parallel directions. In this case, the electronic device 100 can capture displayed content of the specified page in the plurality of directions.

Figure 6:
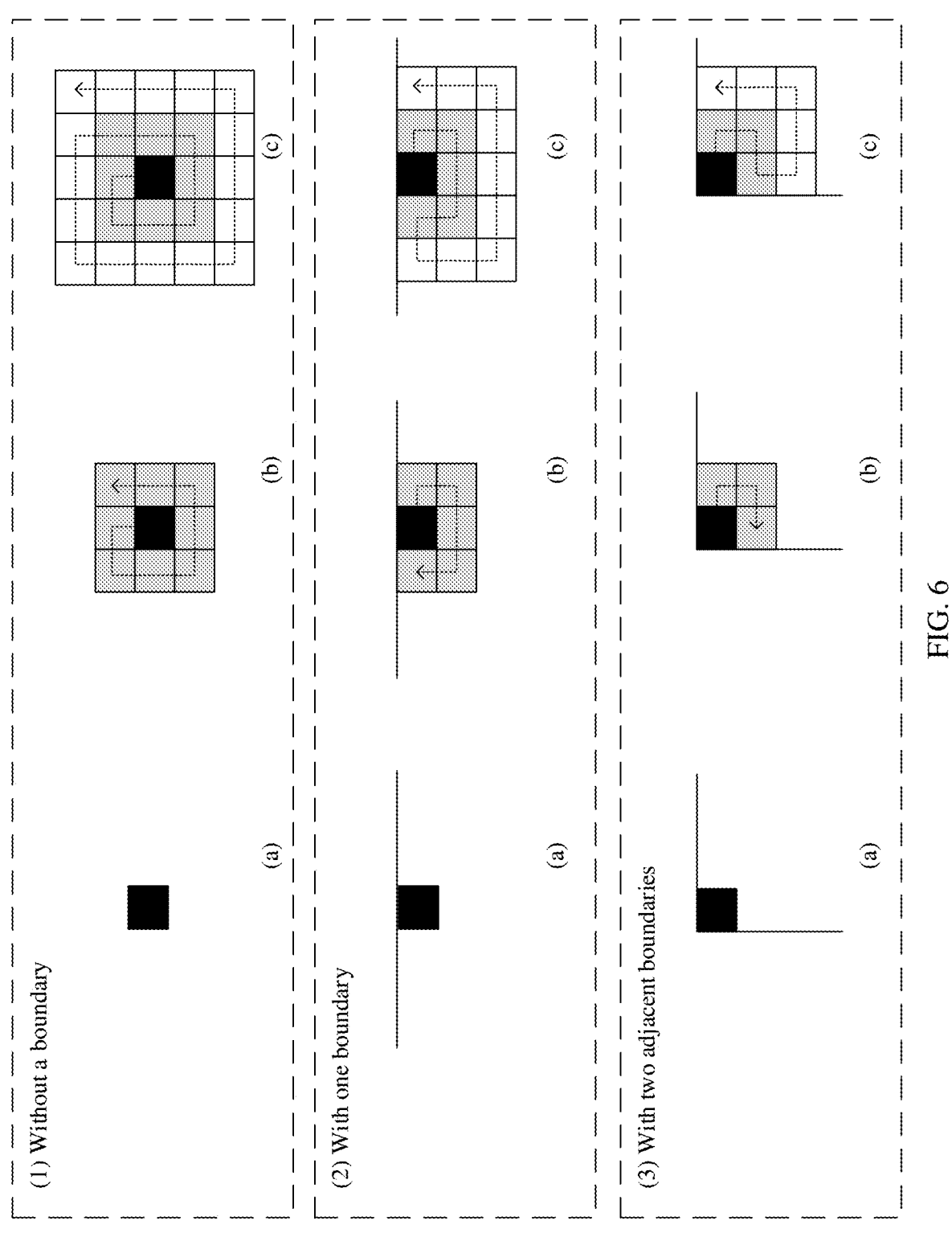
FIG. 6 is a schematic diagram of a preset trajectory according to an embodiment of this application.

The electronic device 100 controls the specified page to sequentially move based on the preset trajectory direction, so that the scrolling window may be sequentially displayed in corresponding positions shown in FIG. 6 based on a direction of a dashed line shown in FIG. 6.

Optionally, the preset trajectory direction may be each movement direction pre-stored in a memory of the electronic device 100. Alternatively, the preset trajectory direction may be a movement direction that the electronic device 100 obtains by receiving a user input.

Figure 3A:
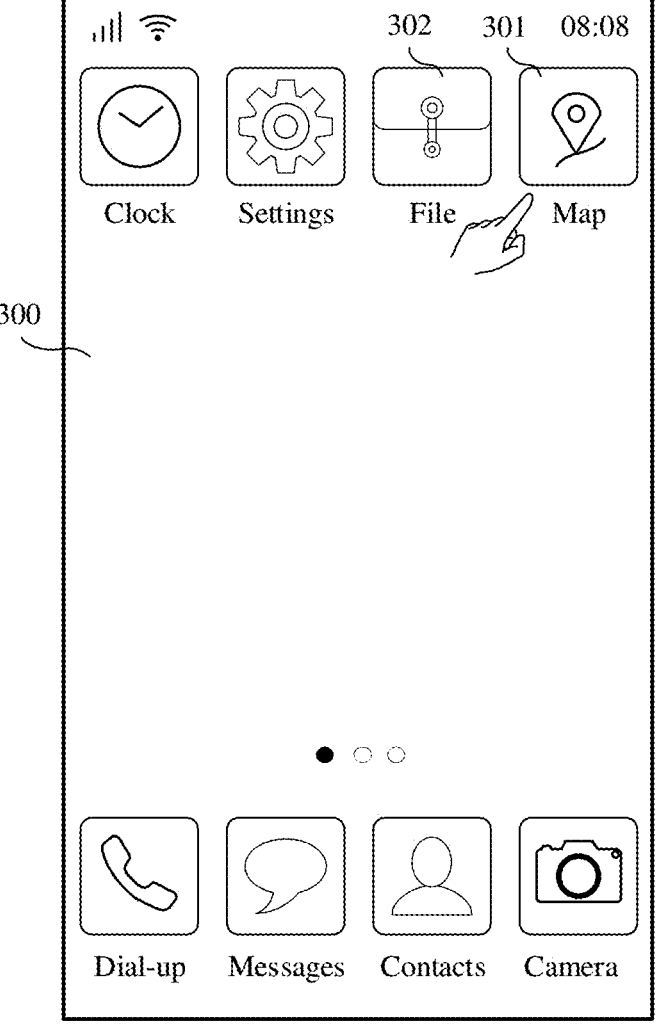
FIG. 3A to FIG. 3O are a group of schematic diagrams of an interface according to an embodiment of this application.

For example, as shown in FIG. 3A, the electronic device 100 may display a desktop 300. The desktop 300 may include a plurality of application icons (for example, a map application icon 301, a file application icon 302, a settings application icon, and a clock application icon). The map application icon 301 may be used to trigger display of a map application interface (for example, a map application interface 310 shown in FIG. 3B), and the file application icon 302 may be used to trigger display of a file application interface (for example, a file application interface 400 shown in FIG. 4A). Optionally, a status bar including icons such as a time identifier icon may be further displayed at a top of the desktop 300. Optionally, a plurality of tray icons (for example, a dial-up application icon, an information application icon, a contact application icon, and a camera application icon) may be displayed below the plurality of application icons, and the tray icons may remain displayed during page switching.

Figure 3B:
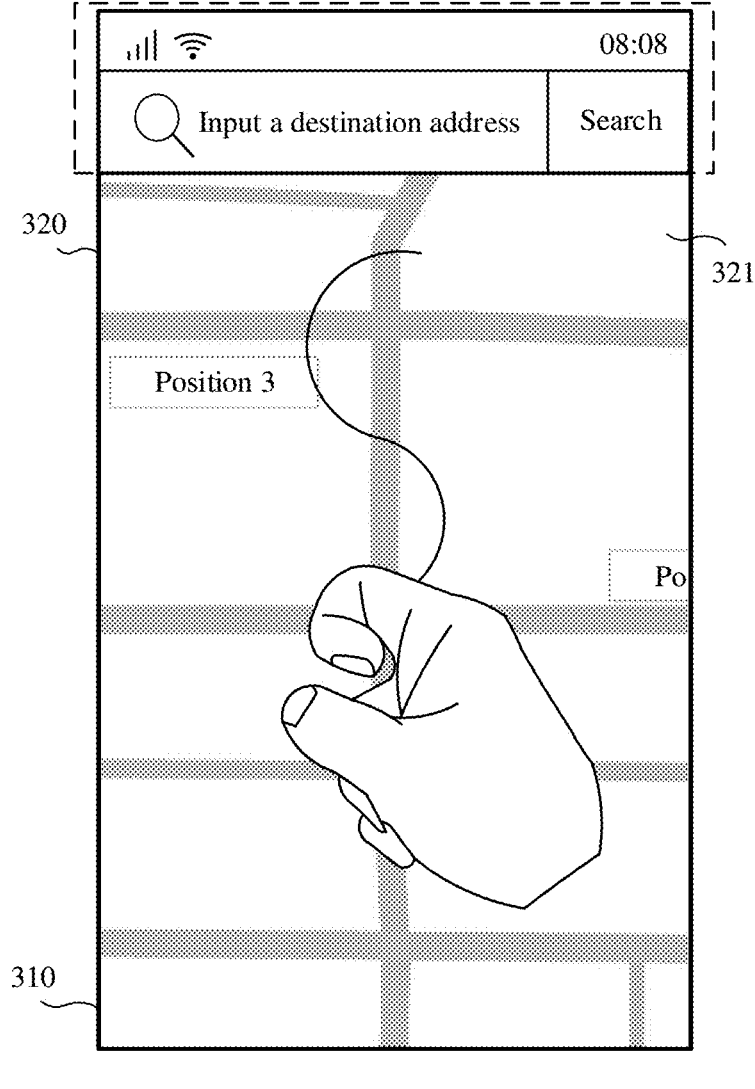

After receiving an input (for example, tapping) of the user for the map application icon 301, the electronic device 100 may display the map application interface 310 shown in FIG. 3B in response to the operation. The map application interface 310 may include a scrolling window 320 and a page element (for example, content indicated by a dashed-line block in the figure). The scrolling window 320 may display a part of a map page 321. For detailed descriptions of the map application interface 310, refer to the embodiment shown in FIG. 2. Details are not described herein again.

The electronic device 100 receives a user input for the map application interface 310 (for example, drawing a specified pattern on the interface by using a knuckle, and the specified pattern may be "S"). In response to the input, the electronic device 100 may display a scrolling screenshot interface 311 shown in FIG. 3C.

Figure 3C:
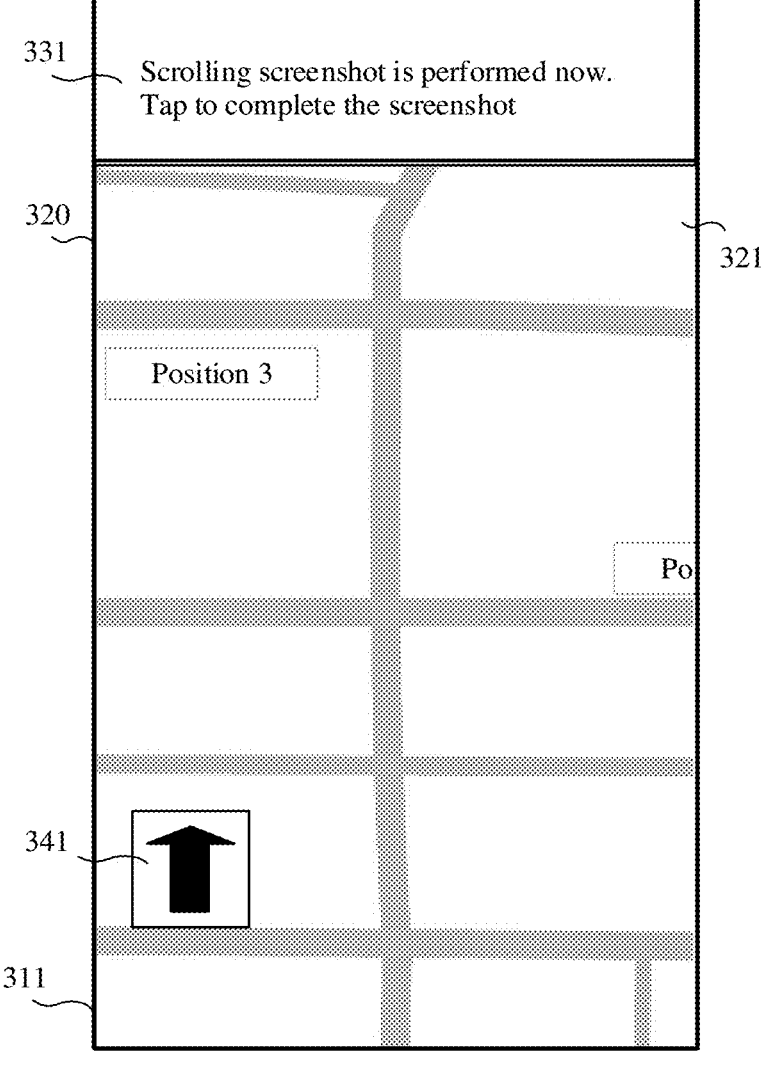

As shown in FIG. 3C, the electronic device 100 may display the scrolling screenshot interface 311. For some descriptions of the scrolling screenshot interface 311, refer to the embodiment shown in FIG. 2. Details are not described herein again. The scrolling screenshot interface 311 may include screenshot prompt information 331. The screenshot prompt information 331 may indicate the user that the electronic device 100 performs a screenshot operation on a currently displayed interface of the electronic device 100. Further, the screenshot prompt information 331 may further indicate the user that the electronic device 100 may stop, in response to an input (for example, tapping) of the user, scrolling screenshot. The screenshot prompt information 331 may be a text prompt, a picture prompt, an animation prompt, or the like. For example, the screenshot prompt information 331 may be a text prompt "Scrolling screenshot is performed now. Tap to complete the screenshot".

Further, the scrolling screenshot interface 311 may further include screenshot status information 341. The screenshot status information 341 may indicate a shape and scope of an interface captured by the electronic device 100, a movement direction of the scrolling window of the electronic device 100, and the like. The screenshot status information 341 may be text information, picture information, animation information, or the like, which is not limited herein. The screenshot status information 341 may indicate that the electronic device 100 captures a first part of the map page 321 displayed in the scrolling window 320, and then the scrolling window 320 of the electronic device 100 moves upward by a preset length (that is, the electronic device 100 controls the map page 321 to move downward by the preset length). An arrow shown in the figure may indicate a movement direction of the scrolling window 320. The preset length is less than or equal to a length of the scrolling window 320.

Figure 3D:
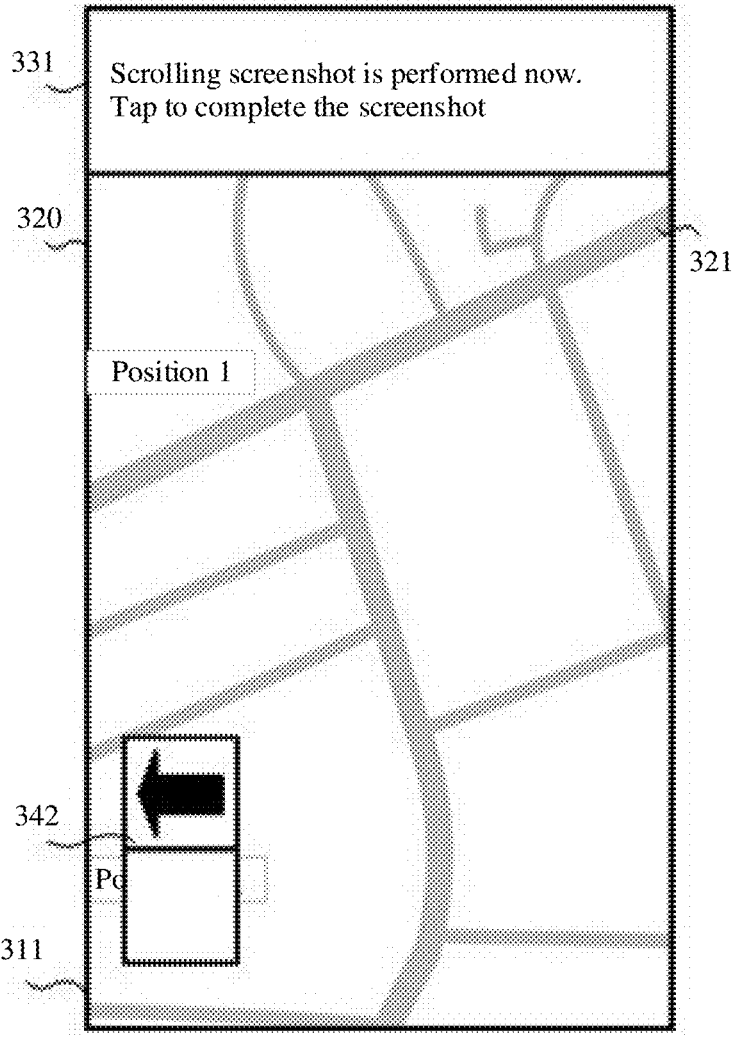

To be specific, the electronic device 100 then scrolls a second part of the map page 321 for display, and the second part is located above the first part, as shown in FIG. 3D. The second part of the map page 321 is displayed in the scrolling window 320 of the electronic device 100. The electronic device 100 may further display screenshot prompt information 342 in the scrolling screenshot interface 311. For descriptions of the scrolling screenshot interface 311 and the screenshot prompt information 342, refer to the embodiment in FIG. 3C. Details are not described herein again. Further, the electronic device 100 may further display screenshot status information 342 in the scrolling screenshot interface 311. The screenshot status information 342 may indicate that the electronic device 100 captures the first part and the second part of the map page 321 displayed in the scrolling window 320, and then the scrolling window 320 of the electronic device 100 moves leftward by a preset width. The preset width is less than or equal to a width of the scrolling window 320.

Figure 3E:
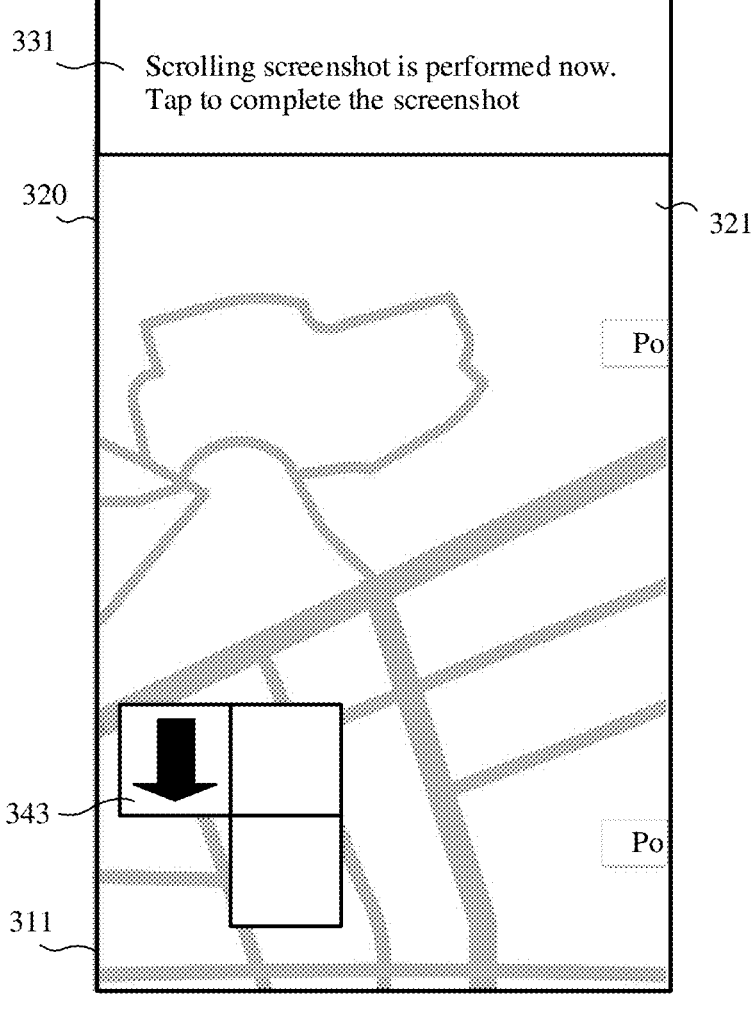

Next, the electronic device 100 may scroll a third part of the map page 321 for display, and the third part is located on the left of the second part, as shown in FIG. 3E. The third part of the map page 321 is displayed in the scrolling window 320 of the electronic device 100. The electronic device 100 may further display screenshot prompt information 342 in the scrolling screenshot interface 311. For descriptions of the scrolling screenshot interface 311 and the screenshot prompt information 342, refer to the embodiment in FIG. 3C. Details are not described herein again. Further, the electronic device 100 may further display screenshot status information 343 in the scrolling screenshot interface 311. The screenshot status information 343 may indicate that the electronic device 100 captures the first part to the third part of the map electronic device 100 moves downward by the preset length.

Figure 3F:
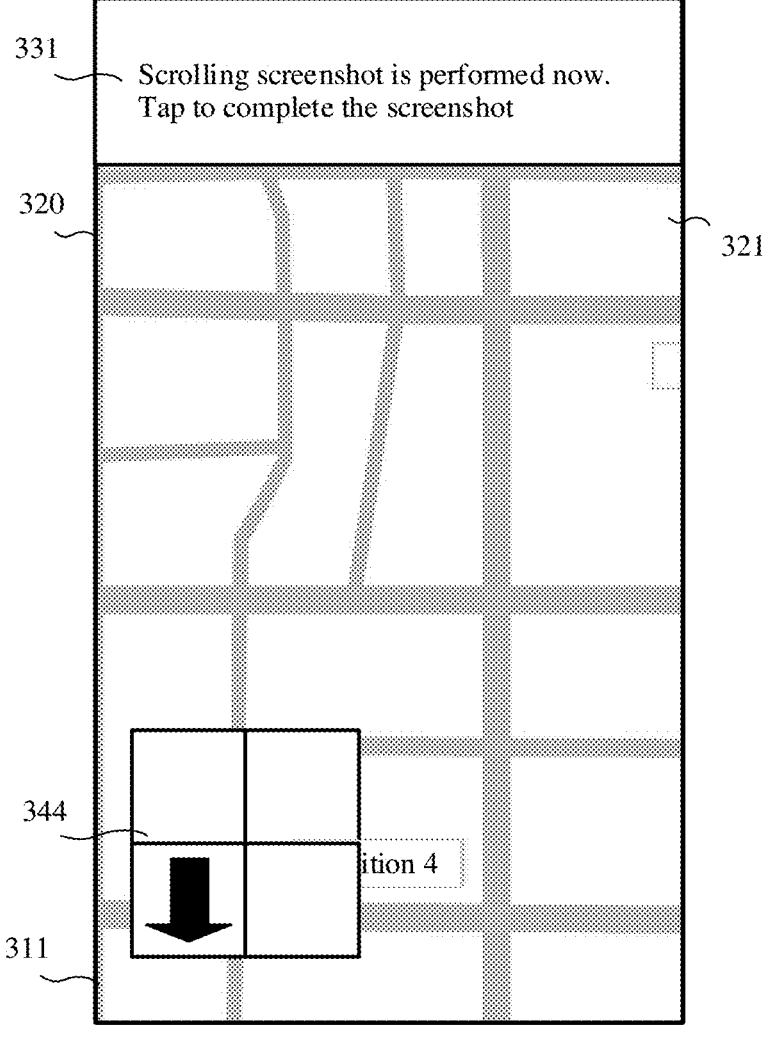

Next, the electronic device 100 may scroll a fourth part of the map page 321 for display, and the fourth part is located below the third part, as shown in FIG. 3F. The fourth part of the map page 321 is displayed in the scrolling window 320 of the electronic device 100. For descriptions of the scrolling screenshot interface 311 and the screenshot prompt information 342 displayed by the electronic device 100, refer to the embodiment in FIG. 3C. Details are not described herein again. Further, the electronic device 100 may further display screenshot status information 344 in the scrolling screenshot interface 311. The screenshot status information 344 may indicate that the electronic device 100 captures the first part to the fourth part of the map page 321 displayed in the scrolling window 320, and then the scrolling window 320 of the electronic device 100 moves downward by the preset length.

Figure 3G:
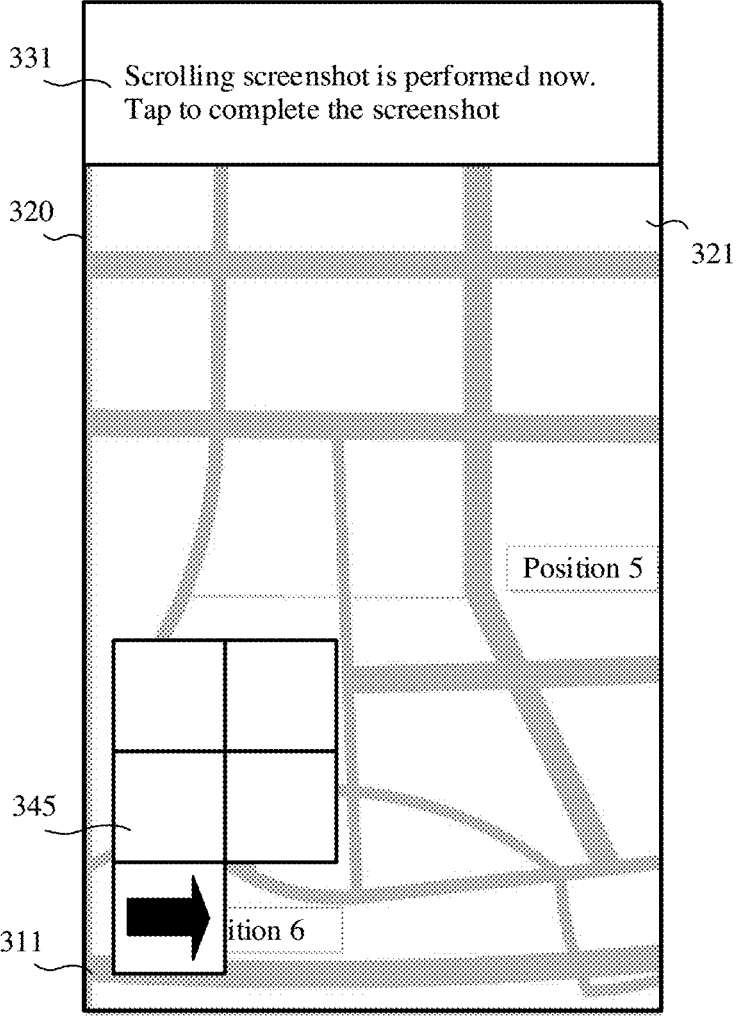

Next, the electronic device 100 may scroll a fifth part of the map page 321 for display, and the fifth part is located below the fourth part, as shown in FIG. 3G. Further, the electronic device 100 may further display screenshot status information 345. The screenshot status information 345 may indicate that the electronic device 100 captures the first part to the fifth part of the map page 321 displayed in the scrolling window 320, and then the scrolling window 320 of the electronic device 100 moves rightward by the preset width.

Figure 3H:
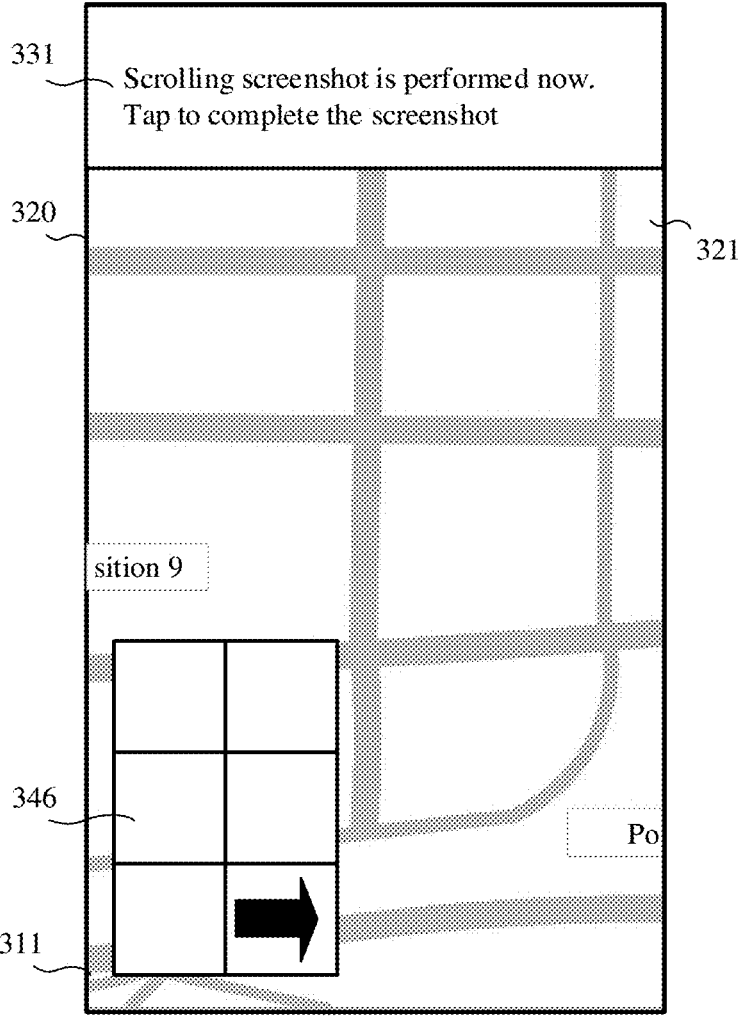

Next, the electronic device 100 may scroll a sixth part of the map page 321 for display, and the sixth part is located on the right of the fifth part, as shown in FIG. 3H. Further, the electronic device 100 may further display screenshot status information 346. The screenshot status information 346 may indicate that the electronic device 100 captures the first part to the sixth part of the map page 321 displayed in the scrolling window 320, and then the scrolling window 320 of the electronic device 100 moves rightward by the preset width.

Figure 3I:
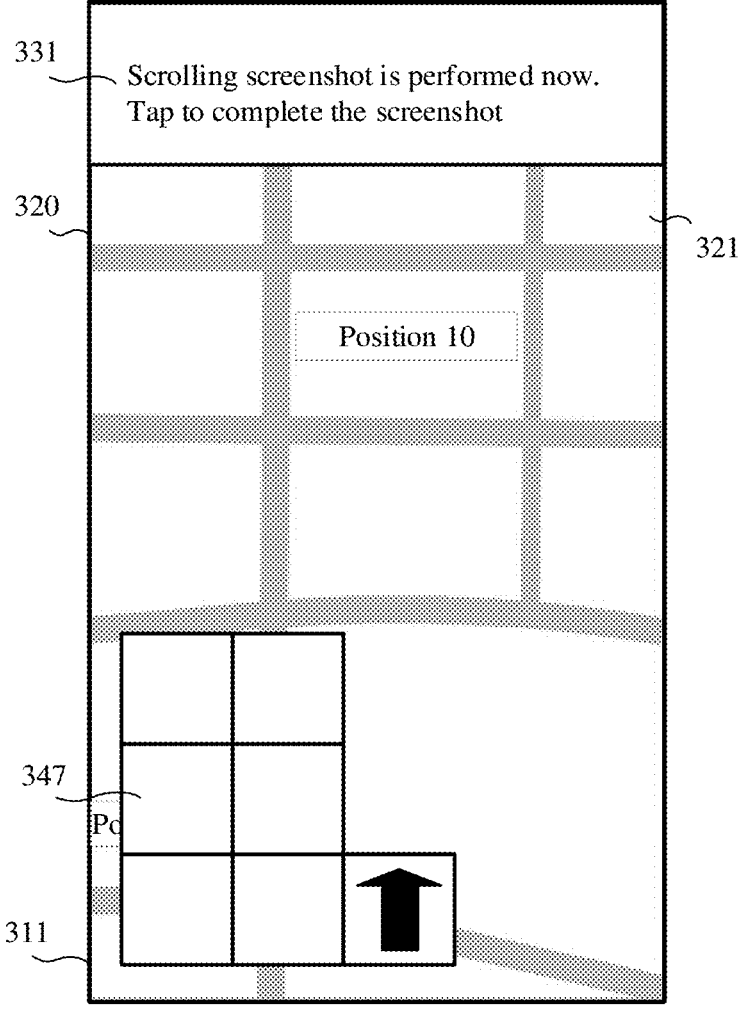

Next, the electronic device 100 may scroll a seventh part of the map page 321 for display, and the seventh part is located on the right of the sixth part, as shown in FIG. 3I. Further, the electronic device 100 may further display screenshot status information 347. The screenshot status information 347 may indicate that the electronic device 100 captures the first part to the seventh part of the map page 321 displayed in the scrolling window 320, and then the scrolling window 320 of the electronic device 100 moves upward by the preset length.

Figure 3J:
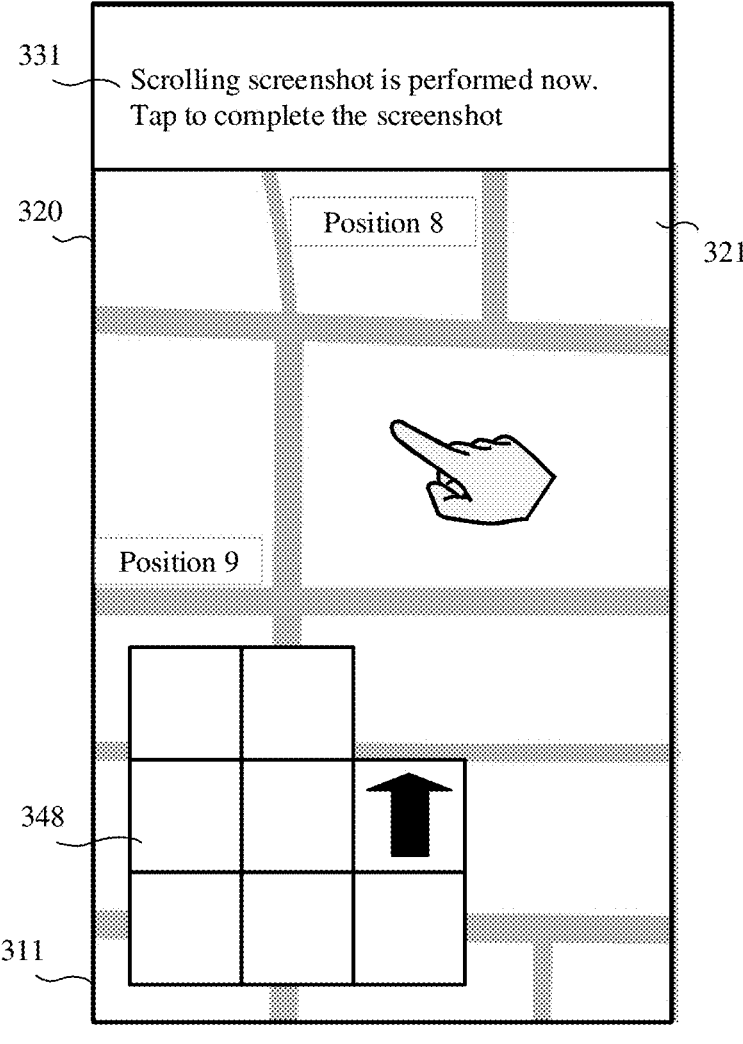

Next, the electronic device 100 may scroll an eighth part of the map page 321 for display, and the eighth part is located above the seventh part, as shown in FIG. 3J. Further, the electronic device 100 may further display screenshot status information 348. The screenshot status information 348 may indicate that the electronic device 100 captures the first part to the eighth part of the map page 321 displayed in the scrolling window 320, and then the scrolling window 320 of the electronic device 100 moves upward by the preset length.

Figure 3K:
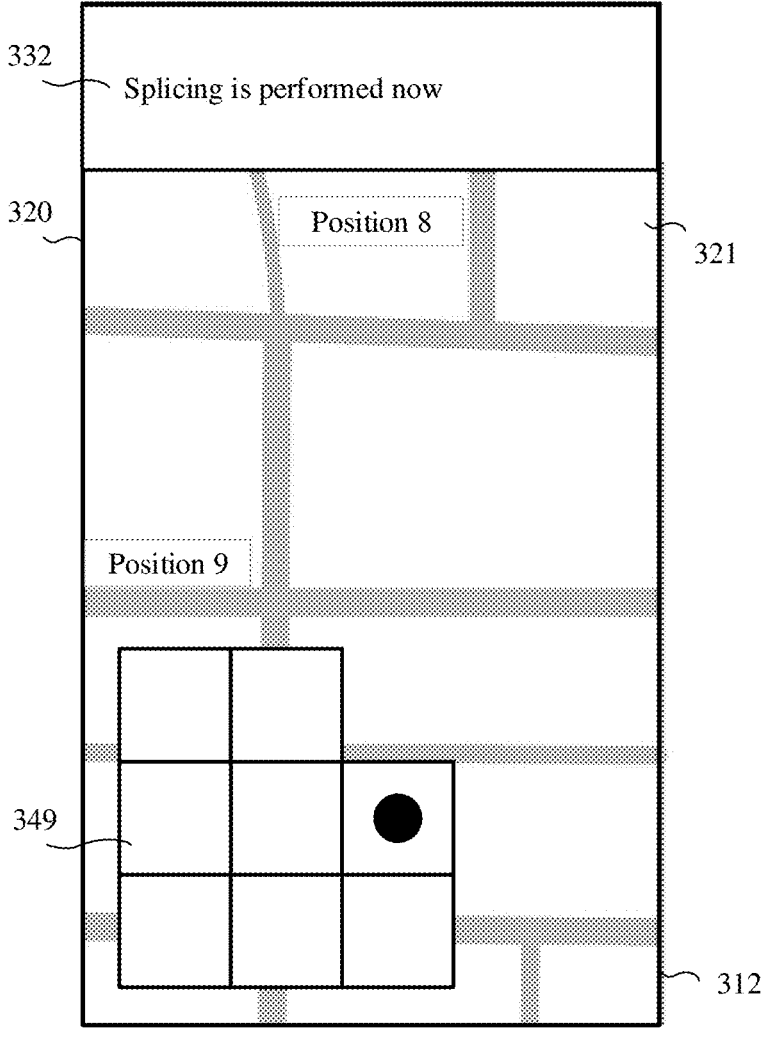

The electronic device 100 may receive an input (for example, tapping) of the user for the scrolling screenshot interface 311 shown in FIG. 3J, and display a scrolling completion interface 312 shown in FIG. 3K in response to the input.

The scrolling completion interface 312 may include completion prompt information 332 and screenshot status information 349. The completion prompt information 332 may indicate the user that the electronic device 100 performs splicing, to obtain the target screenshot image. The completion prompt information 332 may be a text prompt, a picture prompt, an animation prompt, or the like. For example, the completion prompt information 332 may be a text type prompt "Splicing is performed now".

The screenshot status information 349 may indicate that the electronic device 100 captures the first part to the eighth part of the map page 321 displayed in the scrolling window 320, and the scrolling window 320 of the electronic device 100 stops moving. A circle shown in the figure may indicate the scrolling window 320 to stop moving.

After the electronic device 100 receives a user input and stops scrolling content of another part of the map page 321 for display, the electronic device 100 may splice the captured partitioned screenshot images of the first part to the eighth part of the map page 321, to obtain the target screenshot image. The electronic device 100 may obtain a size of an overlapping area of the partitioned screenshot images based on the preset width and a preset height, and cut off a redundant image of the overlapping area, to obtain a target screenshot image that includes all content of the first part to the eighth part of the map page 321 and that does not include repeated content.

The step in which the electronic device 100 displays the scrolling completion interface 312 is optional. After the electronic device 100 performs a scrolling screenshot operation on the first part to the eighth part of the map page 321, the electronic device 100 may directly save the obtained target screenshot image to a gallery, or the electronic device 100 may display the screenshot display interface 350 shown in FIG. 3L.

Figure 3L:
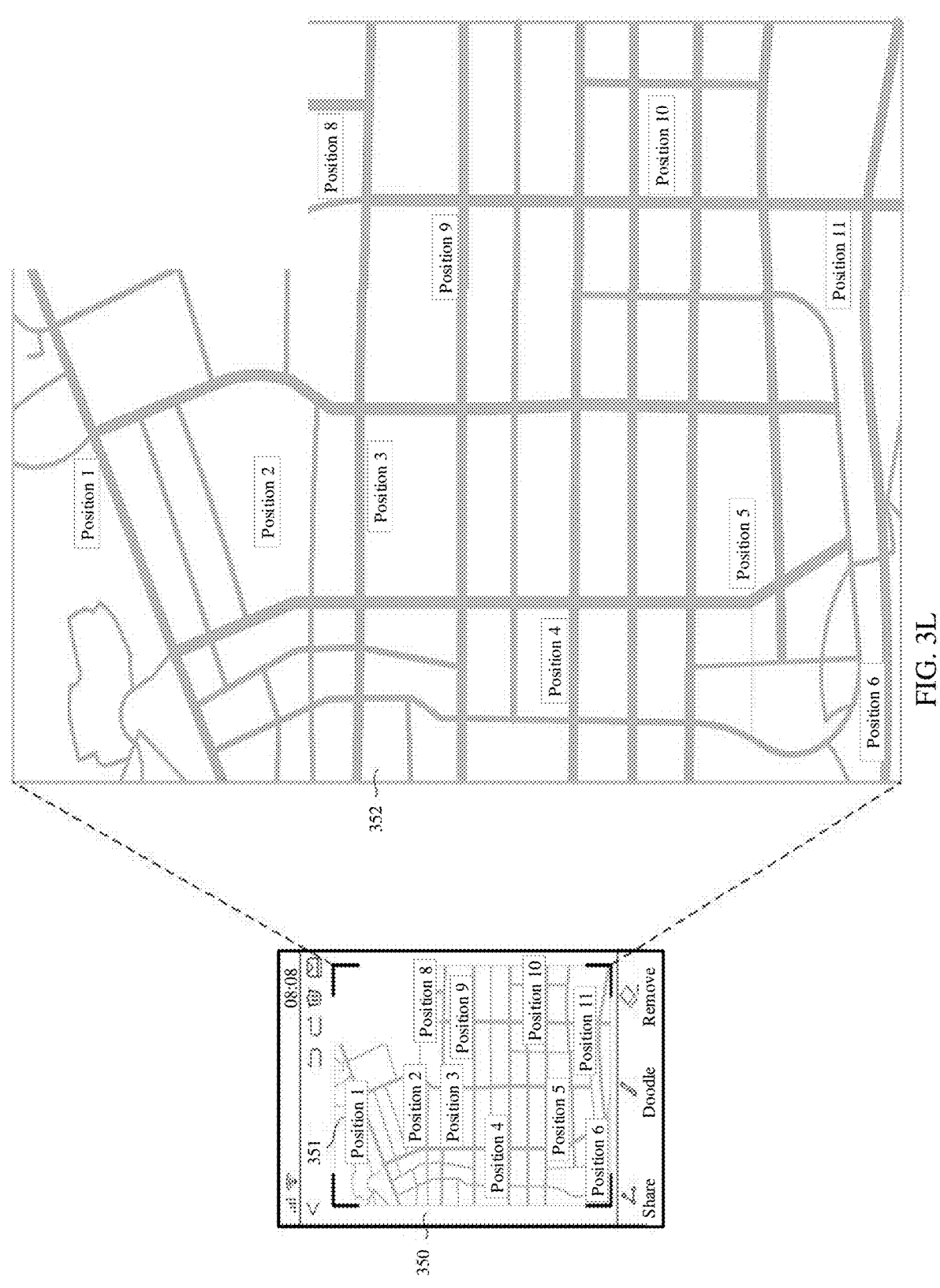

For example, as shown in FIG. 3L, the electronic device 100 displays a screenshot display interface 350. The screenshot display interface 350 may include but is not limited to a return control, a backward control, a forward control, a delete control, a save control, a bottom operation bar, a target screenshot image 351, and the like. The bottom operation bar may include a sharing icon, a doodle icon, an eraser icon, and the like. The electronic device 100 may perform a corresponding operation on the target screenshot image 351 in response to an operation of the user on an icon provided by the bottom operation bar. After capturing the eighth part of the map page 321, the electronic device 100 stops the scrolling screenshot operation. Therefore, the obtained target screenshot image 351 includes only the first part to the eighth part of the map page 321, and there is a gap area in an upper right corner of the target screenshot image 351. The gap area does not include a captured part of the specified page. A length of the gap area is the preset length, and a width of the gap area is the preset width. For a clear image of the target screenshot image 351, refer to a target screenshot image 352. Optionally, the electronic device 100 may not display the screenshot display interface 350 shown in FIG. 3L, and directly save the obtained target screenshot image 351 to the gallery.

In a possible implementation, when receiving the second input, the electronic device 100 may determine a specified area of the electronic device 100 on a specified page. The electronic device 100 may determine whether a plurality of parts of the specified page that are captured by the electronic device 100 completely cover the specified area. If the plurality of parts completely cover the specified area, the electronic device 100 stops scrolling and capturing displayed content in the scrolling window. If the plurality of parts do not completely cover the specified area, the electronic device 100 may continue to scroll for display in the scrolling window and capture a part of the specified page until the plurality of captured parts of the specified page completely cover the specified area. In this case, the electronic device 100 may obtain the target screenshot image with a regular edge.

Specifically, when receiving the second input, the electronic device 100 may obtain the specified area with a regular edge based on positions of the plurality of captured parts of the specified page. The specified area is a smallest rectangle that has a regular edge and includes the plurality of parts of the specified page that have been captured by the electronic device 100.

Optionally, when receiving the second input, the electronic device 100 may obtain, based on sizes and positions of the captured parts of the specified page, a side length of the target screenshot image obtained by splicing the parts of the specified page. If the electronic device 100 detects that side lengths of two parallel sides of the target screenshot image are not equal, the electronic device 100 may continue to scroll for display in the scrolling window and capture a part of the specified page until the side lengths of the parallel sides of the target screenshot image are equal. If detecting that the side lengths of the parallel sides are equal, the electronic device 100 stops scrolling and capturing displayed content in the scrolling window.

After receiving an input (for example, tapping) of the user for the scrolling screenshot interface 311 shown in FIG. 3J, the electronic device 100 may determine the specified area on the specified page. For the specified area, refer to the target screenshot image 371 shown in FIG. 3O. The electronic device 100 may determine whether a plurality of parts of the specified page that are captured by the electronic device 100 completely cover the specified area. The electronic device 100 determines that the first part to the eighth part of the specified page do not completely cover the specified area. The electronic device 100 may scroll the ninth part of the map page 321 shown in FIG. 3M for display.

Figure 3M:
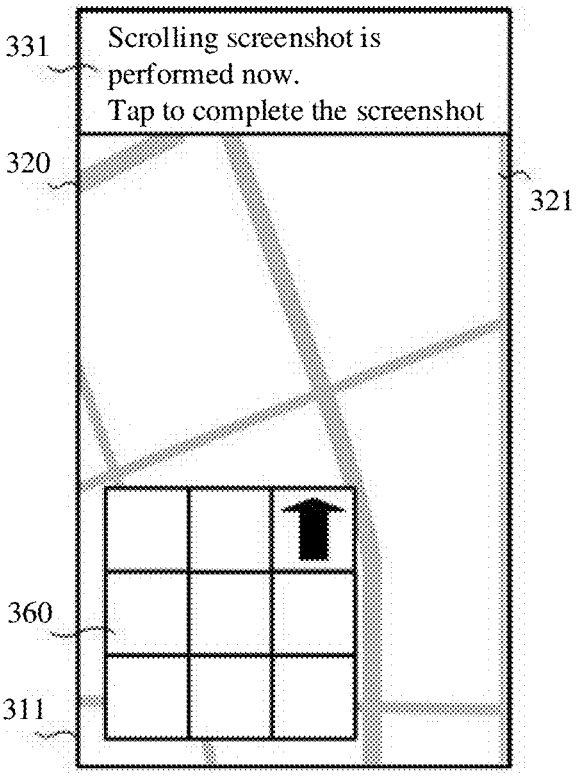

For example, as shown in FIG. 3M, the ninth part of the map page 321 is displayed in the scrolling window 320 of the electronic device 100. The ninth part is located above the eighth part. The electronic device 100 may further display screenshot status information 360. The screenshot status information 360 may indicate that the electronic device 100 captures the first part to the ninth part of the map page 321 displayed in the scrolling window 320, and then the scrolling window 320 of the electronic device 100 moves upward by a preset length.

Figure 3N:
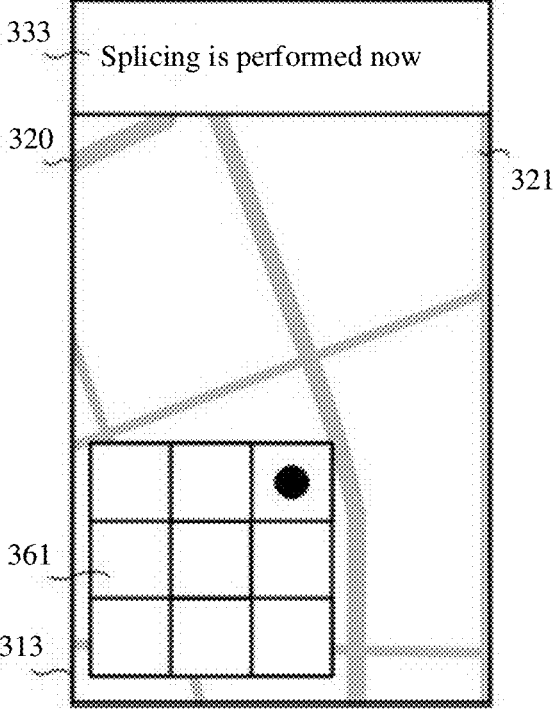

After the electronic device 100 captures the ninth part of the map page 321 displayed in the scrolling window 320, the electronic device 100 determines that the first part to the ninth part of the specified page completely cover the specified area. The electronic device 100 may stop scrolling and capturing the displayed content in the scrolling window, and display a scrolling completion interface 313 shown in FIG. 3N. For a text description of the scrolling completion interface 313, refer to the embodiment shown in FIG. 3K. Details are not described herein again. Further, the scrolling completion interface 313 may include screenshot status information 349. The screenshot status information 349 may indicate that the electronic device 100 captures the first part to the ninth part of the map page 321 displayed in the scrolling window 320, and the scrolling window 320 of the electronic device 100 stops moving. A circle shown in the figure may indicate the scrolling window 320 to stop moving.

The electronic device 100 may splice the captured partitioned screenshot images of the first part to the ninth part of the map page 321, to obtain the target screenshot image. The electronic device 100 may obtain a size of an overlapping area of the partitioned screenshot images based on the preset width and a preset height, and cut off a redundant image of the overlapping area, to obtain a target screenshot image that includes all content of the first part to the ninth part of the map page 321 and that does not include repeated content.

The step in which the electronic device 100 displays the scrolling completion interface 313 is optional. After the electronic device 100 performs a scrolling screenshot operation on the first part to the ninth part of the map page 321, the electronic device 100 may directly save the obtained target screenshot image to a gallery, or the electronic device 100 may display the screenshot display interface 370 shown in FIG. 3O.

Figure 3O:
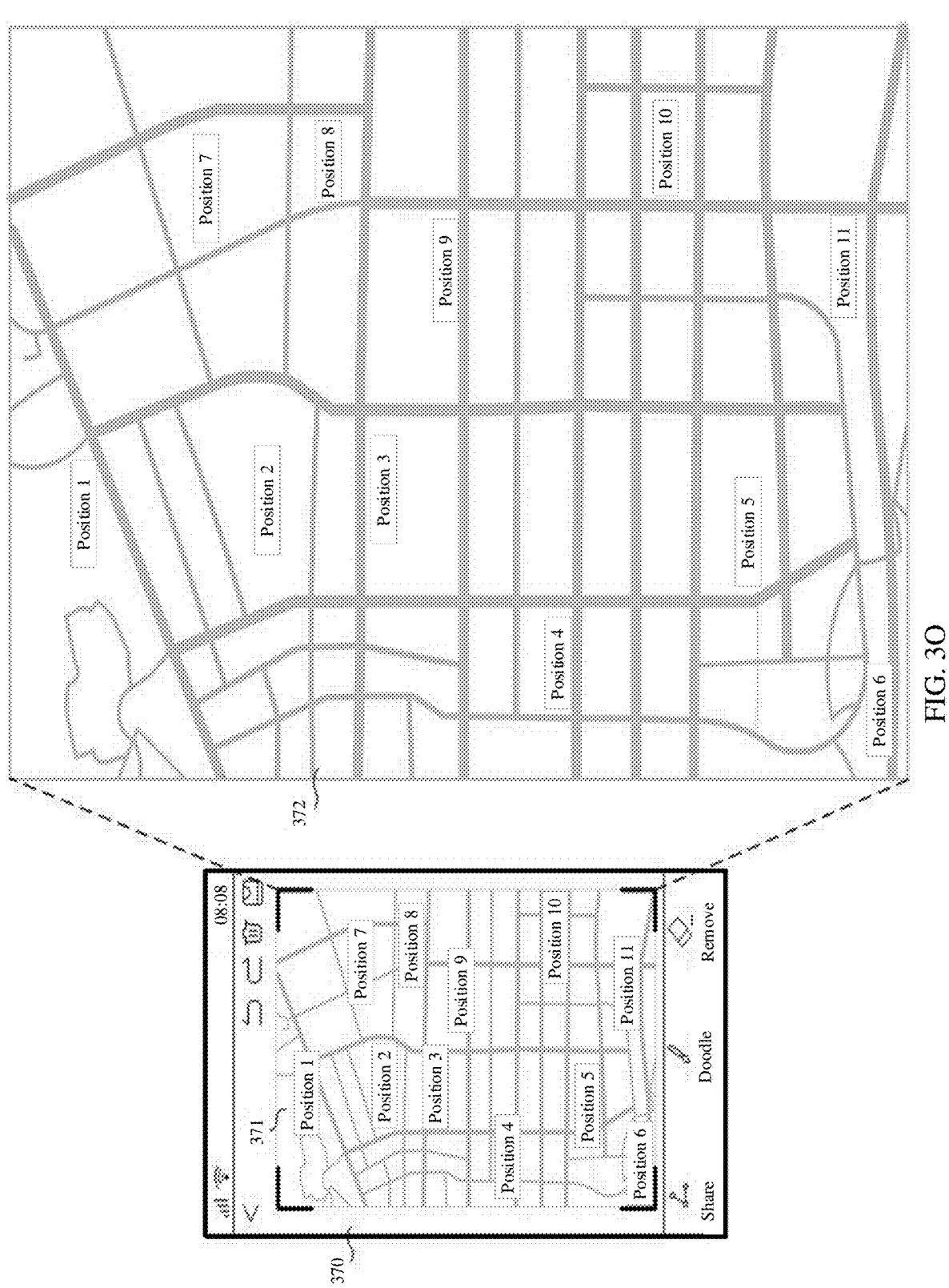

As shown in FIG. 3O, the screenshot display interface 370 may include a target screenshot image 371. The target screenshot image 371 includes all content of the first part to the ninth part of the map page 321. In addition, the target screenshot image 371 does not include a blank gap area. For a text description of the screenshot display interface 370, refer to the embodiment in FIG. 3L. Details are not described herein again. Optionally, the electronic device 100 may not display the screenshot display interface 370 shown in FIG. 3O, and directly save the obtained target screenshot image 371 to the gallery.

In a possible implementation, the electronic device 100 may further stop, based on a quantity of times of screen capturing, scrolling and capturing of the displayed content in the scrolling window. The quantity of times of screen capturing is a positive integer. When the electronic device 100 determines that the quantity of times of screen capturing is greater than or equal to a preset quantity of times, the electronic device 100 may stop scrolling and capturing the displayed content in the scrolling window, to obtain the target screenshot image. In this case, the quantity of times of capturing is preset, and the user does not need to operate the electronic device 100 to stop scrolling and capturing the displayed content in the scrolling window, and the electronic device 100 can automatically obtain the target screenshot image.

For example, when the electronic device 100 performs a scrolling screenshot operation on the map page 321 of the map application interface 310 shown in FIG. 3B, if a value of the preset quantity of times of the electronic device 100 is 9, the electronic device 100 may sequentially display the scrolling screenshot interface 311 shown in FIG. 3C to FIG. 3J, and FIG. 3M. After the electronic device 100 captures the ninth part of the map page 321 shown in FIG. 3M, the electronic device 100 detects that the quantity of times of screen capturing reaches the preset quantity of times, and the electronic device 100 stops scrolling and capturing the displayed content in the scrolling window, to obtain the target screenshot image 371, and displays the screenshot display interface 370 shown in FIG. 3O. Optionally, before displaying the screenshot display interface 370 shown in FIG. 3O, the electronic device 100 may further display the scrolling completion interface 313 shown in FIG. 3N. Optionally, the electronic device 100 may not display the screenshot display interface 370 shown in FIG. 3O, and directly save the obtained target screenshot image 371 to the gallery.

In some possible embodiments, after the electronic device 100 scrolls and captures for the preset quantity of times, the electronic device 100 may determine the specified area of the electronic device 100 on the specified page. The electronic device 100 may determine whether a plurality of parts of the specified page that are captured by the electronic device 100 completely cover the specified area. If the plurality of parts completely cover the specified area, the electronic device 100 stops scrolling and capturing displayed content in the scrolling window. If the plurality of parts do not completely cover the specified area, the electronic device 100 may continue to scroll for display in the scrolling window and capture a part of the specified page until the plurality of captured parts of the specified page completely cover the specified area. In this case, the electronic device 100 may obtain the target screenshot image with a regular edge.

For example, when the electronic device 100 performs a scrolling screenshot operation on the map page 321 of the map application interface 310 shown in FIG. 3B, if a value of the preset quantity of times of the electronic device 100 is 8, the electronic device 100 may sequentially display the scrolling screenshot interface 311 shown in FIG. 3C to FIG. 3J. After the electronic device 100 captures the eighth part of the map page 321 shown in FIG. 3K, the electronic device 100 detects that the quantity of times of screen capturing reaches the preset quantity of times, and the electronic device 100 stops scrolling and capturing the displayed content in the scrolling window. Because the electronic device 100 determines that the first part to the eighth part of the map page 321 that are captured do not completely cover the specified area, the electronic device 100 may continue to scroll for display in the scrolling window and capture a part of the specified page until the plurality of parts of the specified page are captured and completely cover the specified area. In other words, the electronic device 100 displays and captures the ninth part of the map page 321 shown in FIG. 3M. The electronic device 100 determines that the first part to the ninth part of the map page 321 that are captured completely cover the specified area, and stops scrolling and capturing the displayed content in the scrolling window, to obtain the target screenshot image 371.

In a possible implementation, the electronic device 100 may preset a quantity of times of horizontal screen capturing to M and a quantity of times of vertical screen capturing to N. M and N are positive integers, and a total quantity of times of screen capturing by the electronic device 100 is M*N. In this case, the target screenshot image is a rectangular image with a regular edge, and has no gap area.

In some possible embodiments, when the electronic device 100 performs a scrolling screenshot operation on a specific multi-directional interface, the electronic device 100 may stop, based on the preset quantity of times, scrolling and capturing the displayed content in the scrolling window, and the electronic device 100 may further receive a second input of the user, and in response to the second input, stop scrolling and capturing the displayed content in the scrolling window. In this case, the electronic device 100 may receive the user input to obtain a target screenshot image within a page area scope required by the user, or may automatically stop scrolling and capturing the displayed content in the scrolling window when the user input is not received.

In some possible application scenarios, when the electronic device 100 captures a screenshot of the multi-directional interface by using the Scrolling Screenshot application, the specified page displayed in the scrolling window in the multi-directional interface displayed by the electronic device 100 may include at least one boundary. Because the specified page includes the boundary line, when the scrolling window moves toward the boundary line, the scrolling window may not move, or a movement distance may be less than a preset distance (that is, a distance of moving leftward/ rightward is less than a preset width, and a distance of moving upward/downward is less than a preset height). If the scrolling window may not move toward a direction of the boundary, the electronic device 100 may determine, in remaining directions, a direction of a part of the specified page that is not displayed in the scrolling window, and move toward the direction.

For example, the left of the specified page has a boundary, and a distance between a left boundary of the scrolling window and a left boundary of the specified page is greater than the preset width, then the scrolling window moves leftward by the preset width. If a distance between a left boundary of the scrolling window and a left boundary of the specified page is less than the preset width and is greater than zero, the scrolling window moves leftward to an overlapping position between the left boundary of the scrolling window and the left boundary of the specified page, where a movement distance is less than the preset width. If a distance between a left boundary of the scrolling window and a left boundary of the specified page is equal to zero, the scrolling window cannot move leftward, and the electronic device 100 may determine, in three directions, namely upward, downward, and rightward, a direction of a part of the specified page that is not displayed in the scrolling window, and move in the direction.

In a possible implementation, when the electronic device 100 captures a screenshot of the multi-directional interface by using the Scrolling Screenshot application, if the specified page displayed in the scrolling window in the multi-direction interface includes fewer than two boundaries, and the boundaries have an intersection point, the electronic device 100 scrolls different parts of the specified page for display based on a preset trajectory direction. When the electronic device 100 moves to a corner area based on the preset trajectory direction, and parts of the specified page that are captured by the electronic device 100 includes a surrounding part of the corner area, the electronic device 100 may stop scrolling and capturing the displayed content in the scrolling window, to obtain the target screenshot image.

Figure 4A:
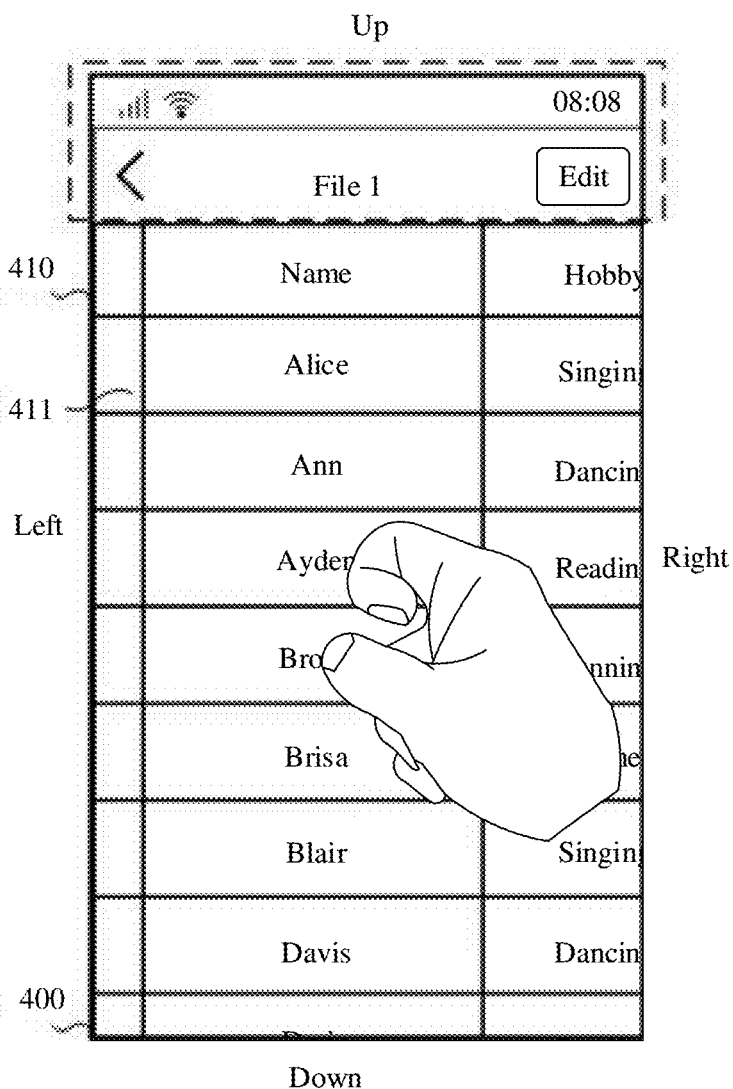
FIG. 4A to FIG. 4K are another group of schematic diagrams of an interface according to an embodiment of this application.

For example, the electronic device 100 may display a file application interface 400 shown in FIG. 4A in response to a user input for the file application icon 302 shown in FIG. 3A.

As shown in FIG. 4A, the file application interface 400 may include but is not limited to a page element and a scrolling window 410. The page element 201 may include all interface elements in a display area other than the scrolling window 410. The page element 201 may include but is not limited to a top status bar and the like. The top status bar may include but is not limited to a network signal identifier icon, a time identifier icon, and the like. Optionally, the page element 201 may further include a file bar. The file bar may include a file name (for example, "file 1"), a return control, an edit control, and the like. The scrolling window 410 may display a first part of a file page 411.

The electronic device 100 receives a user input for the file application interface 400 (for example, drawing a specified pattern on the interface by using a knuckle, and the specified pattern may be "S"). In response to the input, the electronic device 100 may display a scrolling screenshot interface 401 shown in FIG. 4B.

Figure 4B:
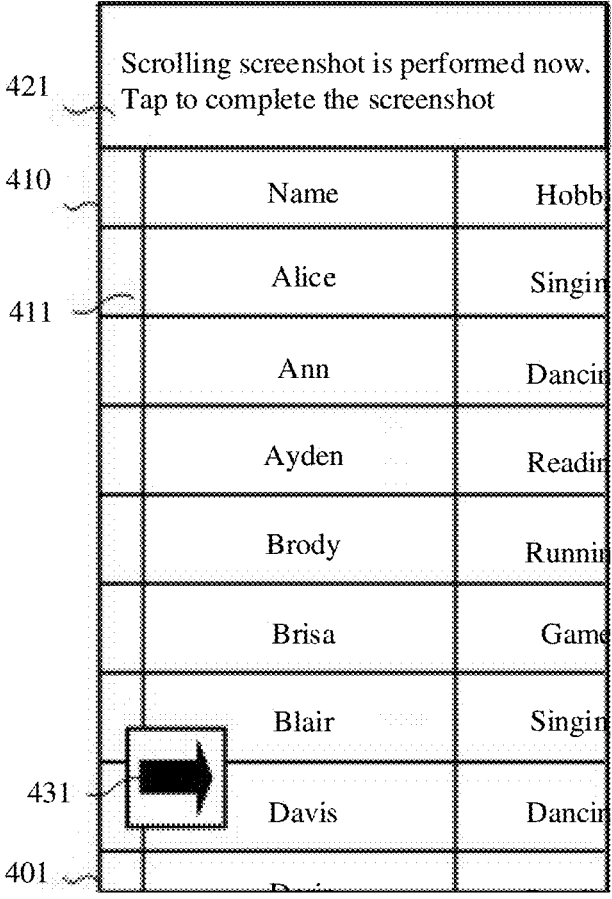

As shown in FIG. 4B, the electronic device 100 displays the scrolling screenshot interface 401. For some descriptions of the scrolling screenshot interface 401, refer to the embodiment shown in FIG. 4A. Details are not described herein again. The scrolling screenshot interface 401 may include screenshot prompt information 421. The screenshot prompt information 421 may indicate the user that the electronic device 100 performs a screenshot operation on a currently displayed interface of the electronic device 100. Further, the screenshot prompt information 421 may further indicate the user that the electronic device 100 may stop, in response to an input (for example, tapping) of the user, scrolling screenshot. The screenshot prompt information 421 may be a text prompt, a picture prompt, an animation prompt, or the like. For example, the screenshot prompt information 421 may be a text prompt "Scrolling screenshot is performed now. Tap to complete the screenshot".

Further, the scrolling screenshot interface 401 may further include screenshot status information 431. The screenshot status information 431 may indicate a shape and scope of an interface captured by the electronic device 100, a movement direction of the scrolling window of the electronic device 100, and the like. The screenshot status information 431 may be text information, picture information, animation information, or the like, which is not limited herein. The screenshot status information 431 herein may indicate that the electronic device 100 captures the first part of the file page 411 displayed in the scrolling window 410 (namely, the scrolling window 410), and then the scrolling window 410 of the electronic device 100 moves rightward by a preset width (that is, the electronic device 100 controls the file page 411 to move leftward by the preset width). An arrow shown in the figure may indicate a movement direction of the scrolling window 410. The preset width is less than or equal to a width of the scrolling window 410.

Because the file page 411 has an upper boundary, and the upper boundary of the file page 411 overlaps an upper boundary of the scrolling window 410, the scrolling window 410 cannot move upward, and the electronic device 100 may move the scrolling window 410 leftward/rightward/downward. This embodiment of this application herein uses an example of moving rightward.

Figure 4C:
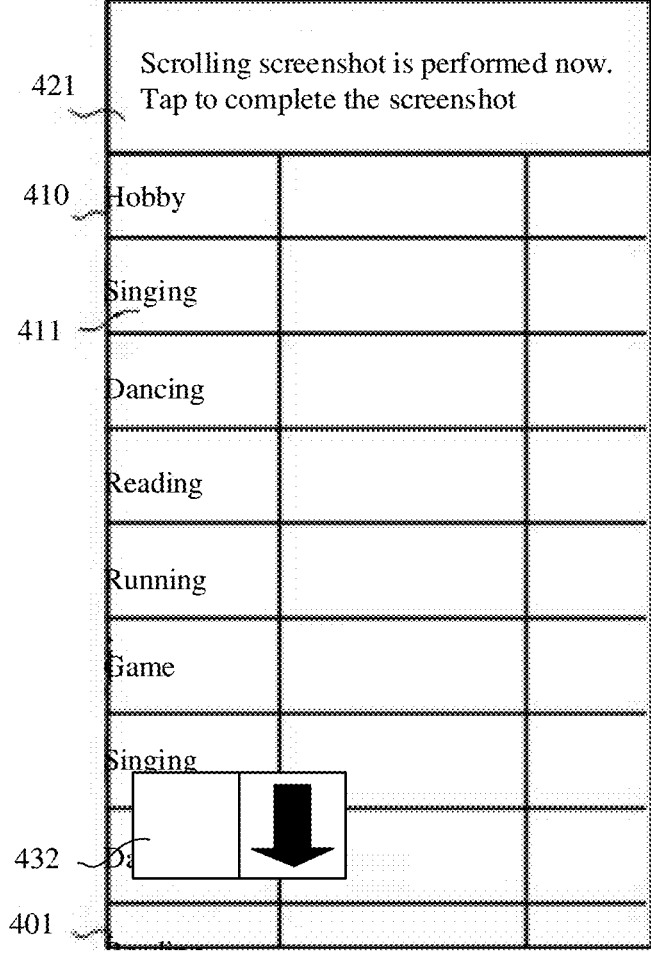

To be specific, the electronic device 100 then scrolls a second part of the file page 411 for display, and the second part is located on the right of the first part, as shown in FIG. 4C. Further, the electronic device 100 may display screenshot status information 432 in the scrolling screenshot interface 401. The screenshot status information 432 may indicate that the electronic device 100 captures the first part and the second part of the file page 411 displayed in the scrolling window 410, and then the scrolling window 410 of the electronic device 100 moves downward by a preset length. The preset length is less than or equal to a length of the scrolling window 410.

Figure 4D:
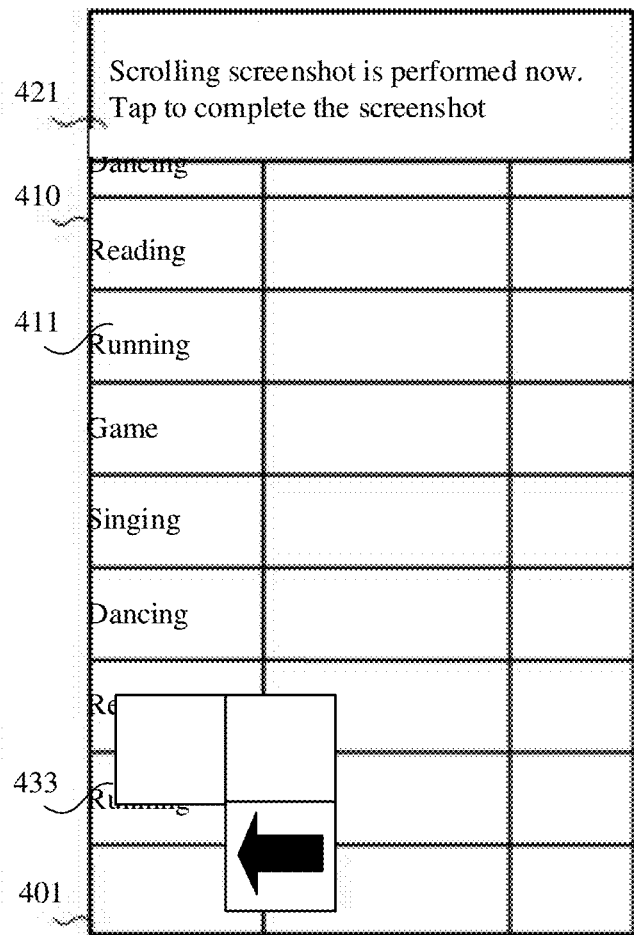

Next, the electronic device 100 may scroll a third part of the file page 411 for display, and the third part is located below the second part, as shown in FIG. 4D. Further, the electronic device 100 may further display screenshot status information 433 in the scrolling screenshot interface 401. The screenshot status information 433 may indicate that the electronic device 100 captures the first part to the third part of the file page 411 displayed in the scrolling window 410, and then the scrolling window 410 of the electronic device 100 moves leftward by the preset width.

Figure 4E:
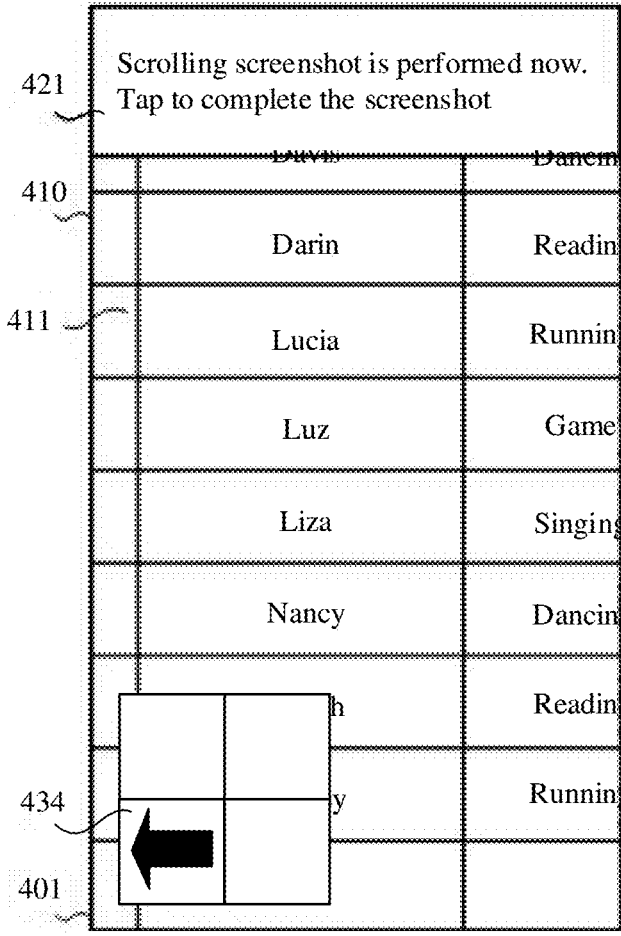

Next, the electronic device 100 may scroll a fourth part of the file page 411 for display, and the fourth part is located on the left of the third part, as shown in FIG. 4E. Further, the electronic device 100 may further display screenshot status information 434 in the scrolling screenshot interface 401. The screenshot status information 434 may indicate that the electronic device 100 captures the first part to the fourth part of the file page 411 displayed in the scrolling window 410, and then the scrolling window 410 of the electronic device 100 moves leftward.

The file page 411 has a left boundary, and the left boundary of the file page 411 does not overlap the left boundary of the scrolling window 410. Therefore, when the scrolling window 410 moves leftward, the movement distance is not determined. If a distance between the left boundary of the scrolling window 410 and the left boundary of the file page 411 is greater than/equal to the preset width, the scrolling window 410 may move leftward by the preset width. If a distance between the left boundary of the scrolling window 410 and the left boundary of the file page 411 is less than the preset width, the scrolling window 410 may move leftward until the left boundary of the scrolling window 410 and the left boundary of the file page 411 overlap each other, and a movement distance is less than the preset width.

This embodiment of this application herein uses an example in which the left boundary of the scrolling window 410 overlaps the left boundary of the file page 411 after the scrolling window 410 moves leftward by the preset width.

Figure 4F:
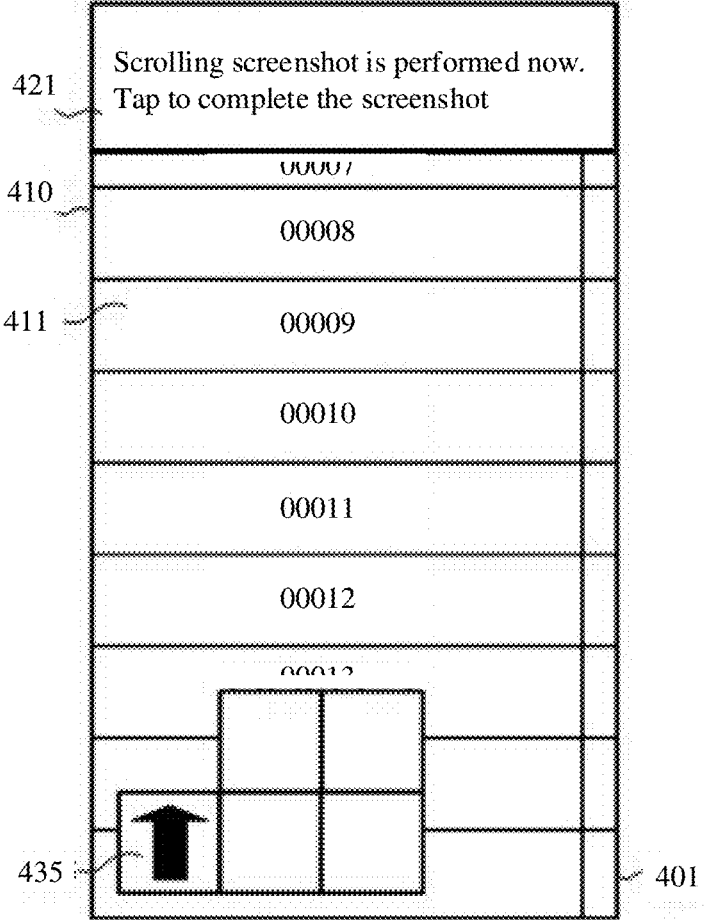

To be specific, the electronic device 100 then scrolls a fifth part of the file page 411 for display, and the fifth part is located on the left of the fourth part, as shown in FIG. 4F. Further, the electronic device 100 may further display screenshot status information 435 in the scrolling screenshot interface 401. The screenshot status information 435 may indicate that the electronic device 100 captures the first part to the fifth part of the file page 411 displayed in the scrolling window 410, and then the scrolling window 410 of the electronic device 100 moves upward by the preset length.

It should be noted that, when the electronic device 100 starts scrolling screenshot, the upper boundary of the scrolling window 410 overlaps the upper boundary of the file page 411, and a movement distance that the scrolling window 410 moves downward is the preset length. Therefore, the scrolling window 410 moves upward by the preset length, and then the upper boundary of the scrolling window 410 exactly overlaps the upper boundary of the file page 411.

Figure 4G:
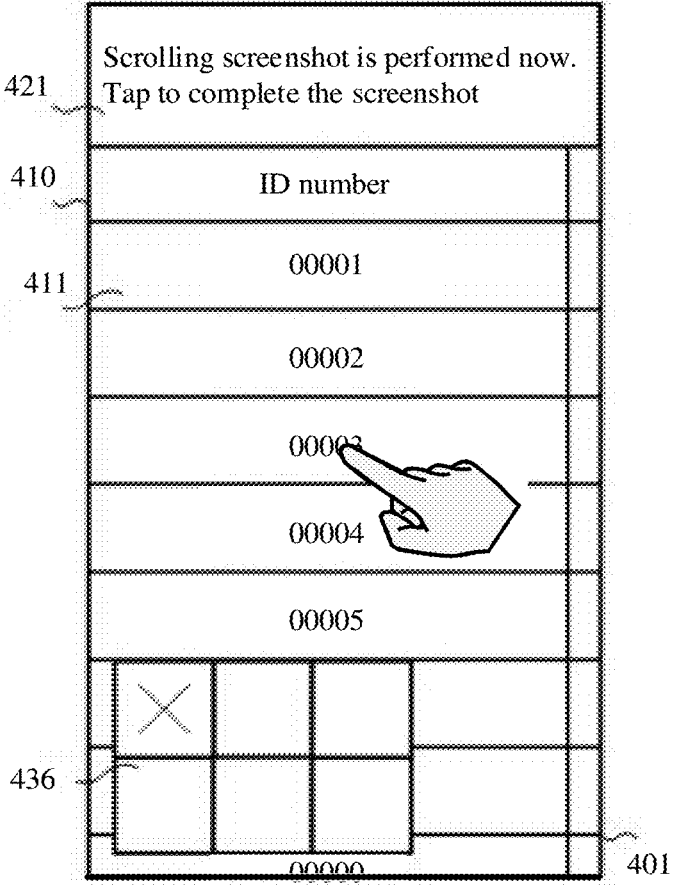

The electronic device 100 may scroll a sixth part of the file page 411 for display, and the sixth part is located above the fifth part, as shown in FIG. 4G. Further, the electronic device 100 may further display screenshot screenshot status information 436 in the scrolling screenshot interface 401. The screenshot status information 436 may indicate that the electronic device 100 captures the first part to the sixth part of the file page 411 displayed in the scrolling window 410, the scrolling window 410 of the electronic device 100 moves to a corner area, and parts of the specified page that are captured by the electronic device 100 includes a surrounding part of the corner area. A cross sign shown in the figure may indicate that the scrolling window 410 cannot move in any direction.

It should be noted that, when the electronic device 100 displays the sixth part of the file page 411, the left boundary of the scrolling window 410 overlaps a left boundary of the file page 411, the upper boundary of the scrolling window 410 overlaps the upper boundary of the file page 411, and a lower boundary and a right boundary of the scrolling window 410 are both adjacent to the captured parts of the file page 411. The scrolling window 410 cannot directly move in any direction.

Figure 4H:
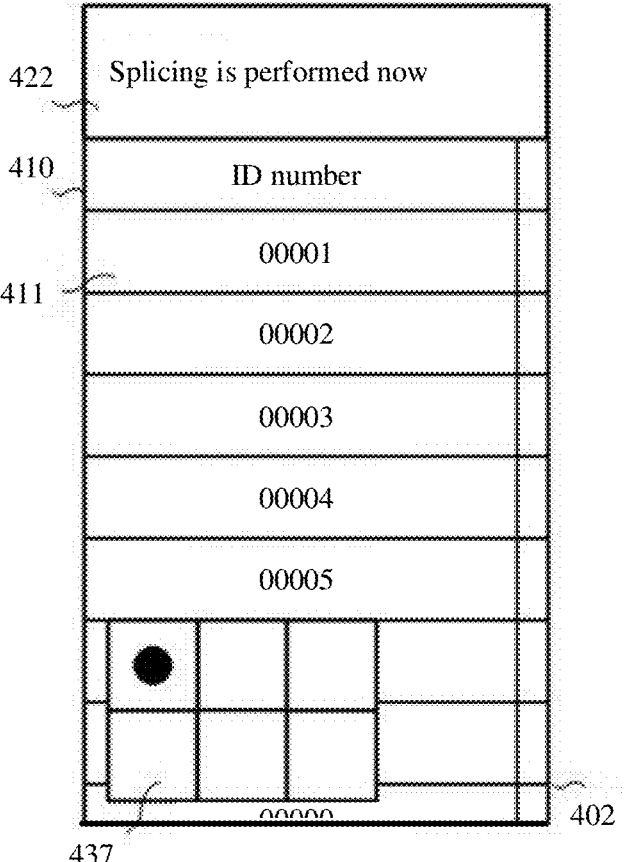

In this case, when the scrolling window 410 of the electronic device 100 moves to a corner area, and parts of the specified page that are captured by the electronic device 100 includes a surrounding part of the corner area, the electronic device 100 may end a scrolling screenshot operation, and obtain a target screenshot image (a target screenshot image 441 shown in FIG. 4I-2) based on the captured partitioned screenshot images. In this time period, the electronic device 100 may display a scrolling completion interface 402 shown in FIG. 4H. The scrolling completion interface 402 may include completion prompt information 422 and screenshot status information 437. For a text description of the completion prompt information 422, refer to the embodiment in FIG. 3K. Details are not described herein again. The screenshot status information 437 may indicate that the electronic device 100 captures the first part to the sixth part of the file page 411 displayed in the scrolling window 320, and the scrolling window 410 of the electronic device 100 stops moving. A circle shown in the figure may indicate the scrolling window 410 to stop moving.

The step in which the electronic device 100 displays the scrolling completion interface 402 is optional. After the electronic device 100 performs a scrolling screenshot operation on the first part to the sixth part of the file page 411, the electronic device 100 may directly save the obtained target screenshot image to a gallery, or the electronic device 100 may display the screenshot display interface 440 shown in FIG. 4I-1.

For example, as shown in FIG. 3L, for a text description of the screenshot display interface 440, refer to the embodiment shown in FIG. 3L. Details are not described herein again. The screenshot display interface 440 may include a target screenshot image 441. The target screenshot image 441 includes all content of the first part to the sixth part of the file page 411 and the content not repeated. Optionally, the electronic device 100 may not display the screenshot display interface 440 shown in FIG. 4I-1, and directly save the obtained target screenshot image 441 to the gallery.

In a possible implementation, when the electronic device 100 captures a screenshot of the multi-directional interface with two intersecting boundaries by using the Scrolling Screenshot application, the electronic device 100 controls the scrolling window to scroll, based on the preset trajectory direction, a corner area of the specified page for display, and parts of the specified page that are captured by the electronic device 100 includes a surrounding part of the corner area, the electronic device 100 may also jump to a recently moved part of the specified page that may further move in another direction. Then, when the electronic device 100 receives the second input (for example, tapping) of the user, in response to the second input, the electronic device 100 may stop scrolling and capturing the displayed content in the scrolling window, to obtain a target screenshot image. In this case, the electronic device 100 may stop a screen capture operation based on an intention of the user, to obtain a target screenshot image required by the user.

Figures 1, 4I:
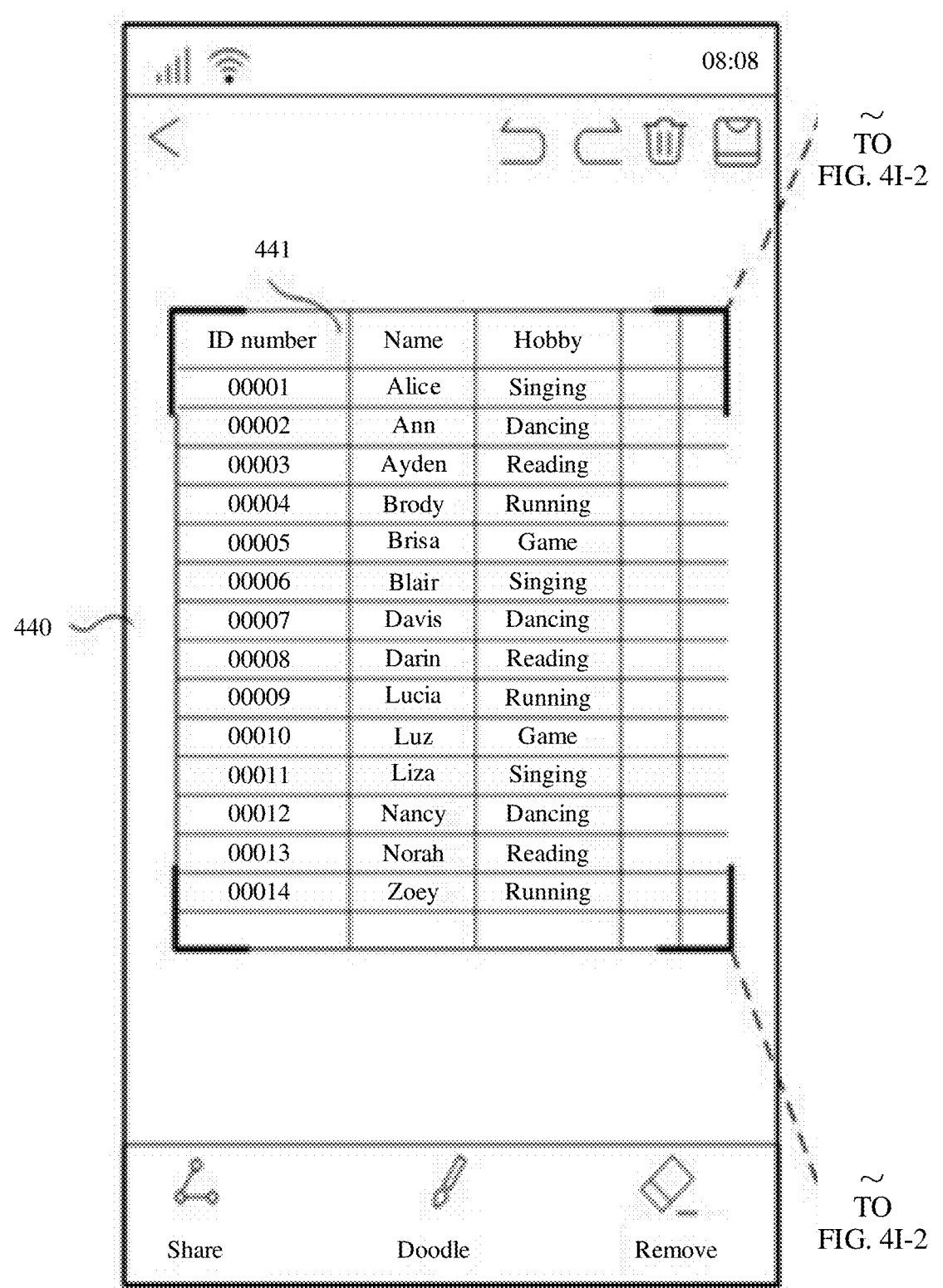
Figure 4J:
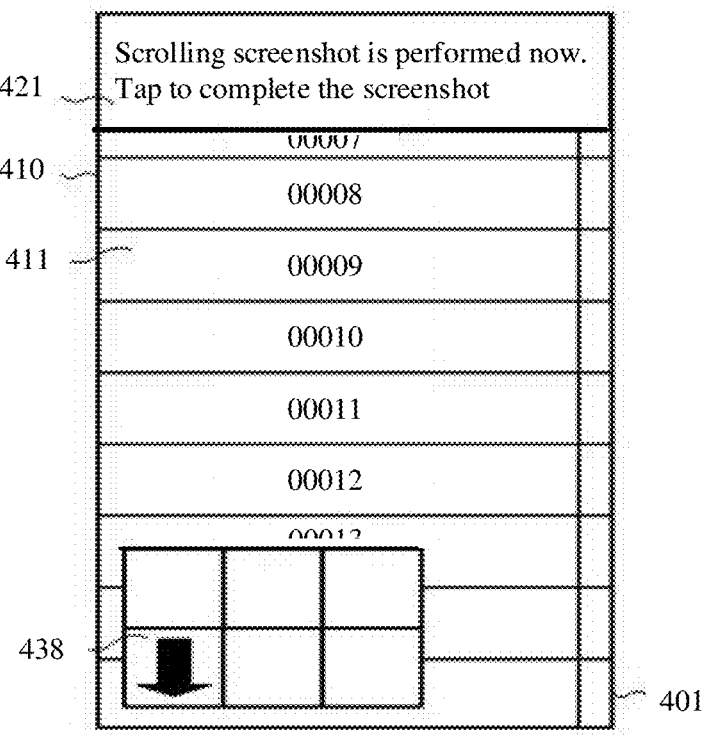

For example, after displaying the scrolling screenshot interface 401 shown in FIG. 4G, the electronic device 100 may determine that the sixth part is a corner area of the file page 411, and parts of the specified page that are captured by the electronic device 100 include surrounding parts (the first part and the fifth part) of the corner area. The electronic device 100 may jump to the fifth part of the file page 411 for display, as shown in FIG. 4J. The fifth part of the file page 411 is a page area that is recently moved by the electronic device 100 and that may further move in another direction.

The scrolling screenshot interface 401 shown in FIG. 4J includes the fifth part of the file page 411. Further, the electronic device 100 may further display screenshot status information 438 in the scrolling screenshot interface 401. The screenshot status information 438 may indicate that the electronic device 100 captures the first part to the sixth part of the file page 411 displayed in the scrolling window 410, and then the scrolling window 410 of the electronic device 100 moves downward by the preset length.

Figure 4K:
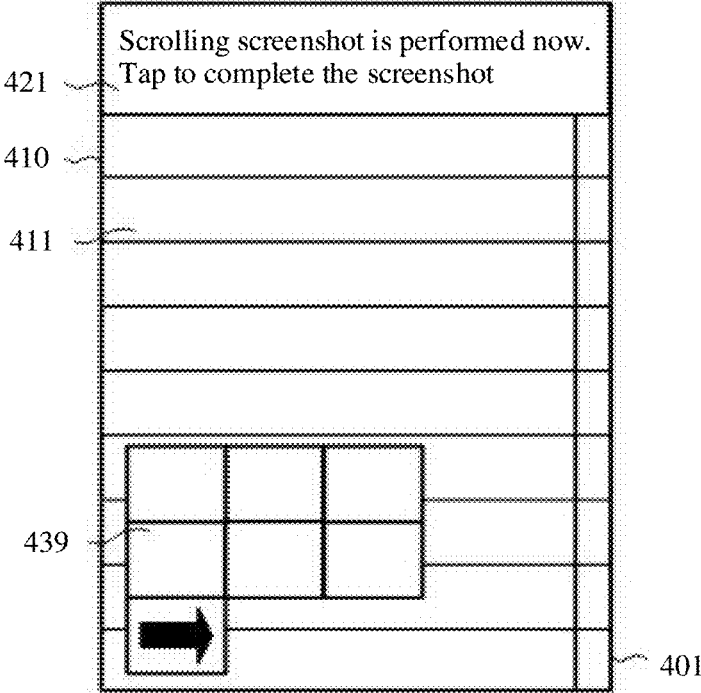

Next, the electronic device 100 may scroll the seventh part of the file page 411 for display, and the seventh part is located below the fifth part, as shown in FIG. 4K. Further, the electronic device 100 may further display screenshot status information 439 in the scrolling screenshot interface 401. The screenshot status information 439 may indicate that the electronic device 100 captures the first part to the seventh part of the file page 411 displayed in the scrolling window 410, and then the scrolling window 410 of the electronic device 100 moves rightward by the preset width.

Next, the electronic device 100 may continue to move in the preset trajectory direction until the second input is received. The electronic device 100 may obtain the target screenshot image in response to the second input. For this process, refer to the embodiments in FIG. 4H, FIG. 4I-1 and FIG. 4I-2, and details are not described herein again.

In a possible implementation, if the electronic device 100 moves to the corner area (surrounding parts are captured by the electronic device 100) before the quantity of times of screen capturing reaches the preset quantity of times, the electronic device 100 may jump to a recently moved page area that may further move in another direction, until the quantity of times of screen capturing by the electronic device 100 reaches the preset quantity of times. Then, the electronic device 100 stops scrolling and capturing the displayed content in the scrolling window, to obtain the target screenshot image. In this case, the electronic device 100 may stop a screen capture operation based on the preset quantity of times set by the user, to obtain the target screenshot image that includes content required by the user.

For example, when the electronic device 100 performs a scrolling screenshot operation on the file application interface 400 shown in FIG. 4A, if the preset quantity of times of the electronic device 100 is 7, for a scrolling screenshot process of the electronic device 100, refer to the embodiments in FIG. 4B to FIG. 4G, FIG. 4J, and FIG. 4K. Details are not described herein again. After displaying the seventh part of the file page 411 shown in FIG. 4K, the electronic device 100 may capture the seventh part of the file page 411, to obtain one partitioned screenshot image. The electronic device 100 may splice based on the plurality of captured partitioned screenshot images, to obtain the target screenshot image.

In a possible implementation, the multi-directional interface displayed by the electronic device 100 includes valid content. For example, the electronic device 100 may identify whether displayed content in the current scrolling window includes valid content. If the electronic device 100 determines that the displayed content in the scrolling window includes the valid content, the electronic device 100 may continue to scroll for display in the scrolling window and capture a part of the specified page. If the electronic device 100 determines that the displayed content in scrolling mode of the scrolling window does not include the valid content, the electronic device 100 may stop scrolling and capturing the displayed content in the scrolling window.

The valid content may be text content, picture content, animation content, or the like. For example, the electronic device 100 may identify, according to an image recognition algorithm (for example, a convolutional neural network algorithm), whether the content currently displayed in the scrolling window includes valid content.

Optionally, if the electronic device 100 determines that the displayed content in the scrolling window does not include the valid content, the electronic device 100 may determine the specified area of the electronic device 100 on the specified page. The electronic device 100 may determine whether a plurality of parts of the specified page that are captured by the electronic device 100 completely cover the specified area. If the plurality of parts completely cover the specified area, the electronic device 100 stops scrolling and capturing displayed content in the scrolling window. If the plurality of parts do not completely cover the specified area, the electronic device 100 may continue to scroll for display in the scrolling window and capture a part of the specified page until the plurality of captured parts of the specified page completely cover the specified area. In this case, the electronic device 100 may obtain the smallest target screenshot image that has a regular edge and that includes text information.

Optionally, before the electronic device 100 stops, based on valid content, scrolling and capturing the displayed content in the scrolling window, if the scrolling window of the electronic device 100 displays a corner area of the specified page, and parts of the specified page that are captured by the electronic device 100 includes a surrounding part of the corner area, the electronic device 100 may directly stop scrolling and capturing the displayed content in the scrolling window, or the electronic device 100 may jump to a recently moved part of the specified page that may further move in another direction, until the electronic device 100 determines that displayed content in a next scrolling of the scrolling window does not include valid content. The electronic device 100 may stop scrolling and capturing the displayed content in the scrolling window, to obtain the target screenshot image. In this case, the electronic device 100 may obtain all target screenshot images including valid content.

For example, when the electronic device 100 performs a scrolling screenshot operation on the file application interface 400 shown in FIG. 4A, for a process of performing scrolling screenshot by the electronic device 100, refer to the embodiments in FIG. 4B to FIG. 4G and FIG. 4J. Details are not described herein again. After the electronic device 100 displays the sixth part of the file page 411 shown in FIG. 4J, the electronic device 100 may control the file page 411 to move upward by the preset length, and the scrolling window 410 may display the seventh part of the file page 411 (as shown in FIG. 4K). The electronic device 100 detects that the seventh part of the file page 411 does not include valid content (which may mean text content herein). The electronic device 100 may stop scrolling and capturing the displayed content in the scrolling window, and splice the plurality of captured partitioned screenshot images to obtain the target screenshot image. The target screenshot image obtained by the electronic device 100 includes content of the first part to the sixth part of the file page 411.

Optionally, after displaying the seventh part of the file page 411 and detecting that the seventh part of the file page 411 does not include valid content, the electronic device 100 may return to display the sixth part of the file page 411.

The following describes a schematic flowchart of a scrolling screenshot method according to an embodiment of this application.

Figure 5:
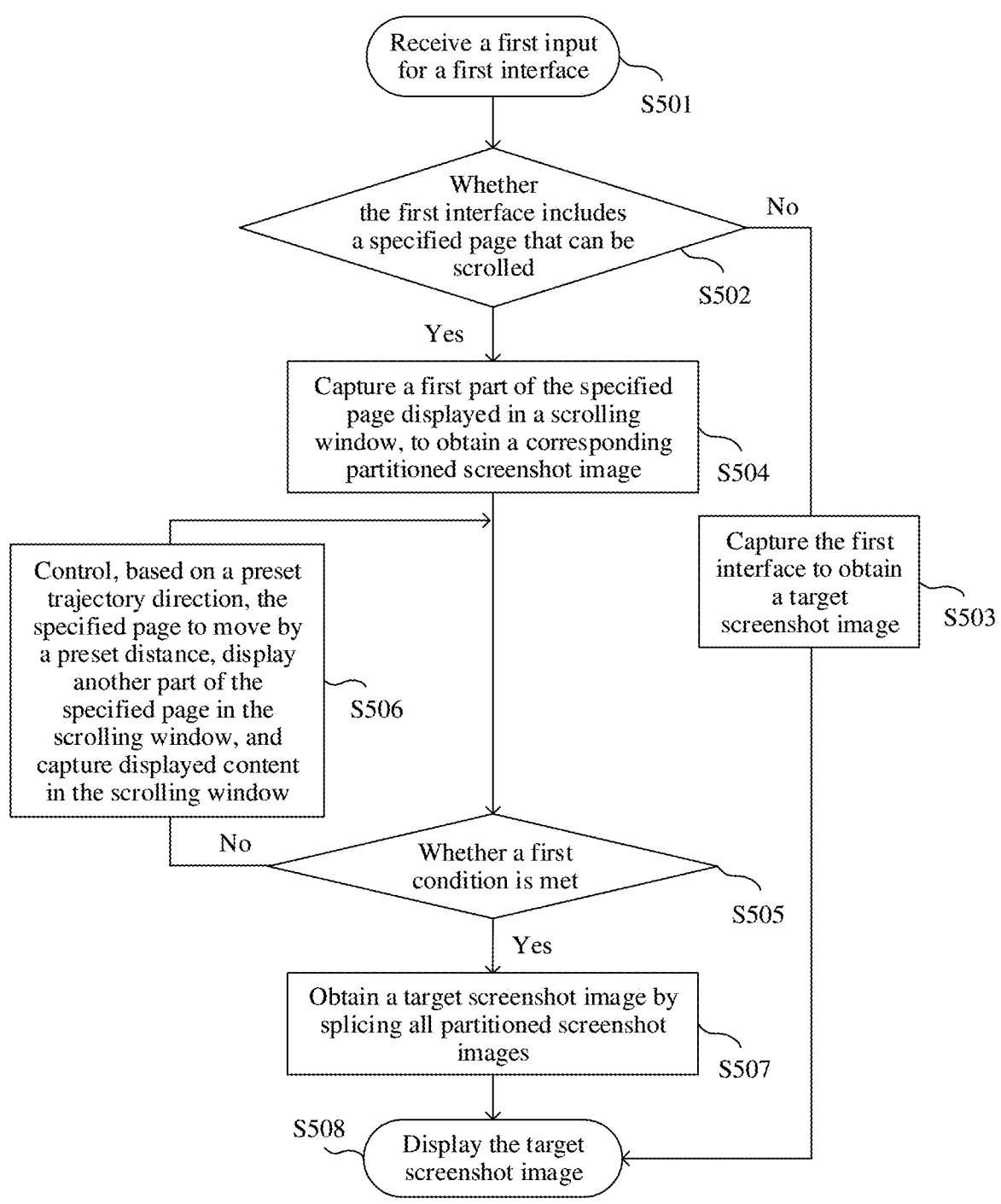
FIG. 5 is a flowchart of a scrolling screenshot method according to an embodiment of this application.

For example, as shown in FIG. 5, the method may include the following steps.

S501: An electronic device 100 receives a first input for a first interface.

The first interface is the foregoing multi-directional interface, for example, the map application interface 310 shown in FIG. 3B, and the file application interface 400 shown in FIG. 4A.

The first input is not limited to tapping, double tapping, touching and holding, sliding, a voice command input, and the like. For example, the first input may be sliding down with three fingers, or knuckle tapping and drawing a specified pattern (for example, an "S" pattern) on the screen, as shown in FIG. 3B. In some application scenarios, the first input may alternatively be a set of user operations.

After receiving the first input for the first interface, the electronic device 100 performs step S502 in response to the first input.

S502: The electronic device 100 determines whether the first interface includes a specified page that can be scrolled.

If the electronic device 100 determines that the first interface includes the specified page that can be scrolled, step S504 is performed. If the electronic device 100 determines that the first interface does not include the specified page that can be scrolled, step S503 is performed.

There are many methods for the electronic device 100 to determine whether the first interface includes the specified page that can be scrolled. This embodiment of this application herein may use examples to describe several possible determining methods. The following is the examples.

(1) The electronic device 100 may obtain a page element of the first interface, and determine, by determining whether a name of the page element includes a specific field, whether the page element is the specified page that can be scrolled. The specific field may be a field usually included in a name of a scrollable page element, for example, "webview", "scrollview", "listview", "recycleview", or "contentview". If a name of a specific page element includes the specific field, it is determined that the page element can be scrolled. If a name of a specific page element does not include the specific field, the page element cannot be scrolled.

(2) The electronic device 100 may preset one scrolling element list, and the electronic device 100 may update the list at a preset interval. When parsing the first interface, the electronic device 100 queries the scrolling element list of the first interface, to obtain the specified page that can be scrolled.

For example, Table 1 is a scrolling element list corresponding to the map application interface 310 shown in FIG. 3B.

TABLE 1

| Scrolling element list of a notepad application interface | |
| --- | --- |
| Page element name | Scrollable or not |
| scrollview_page | Yes |
| display_area | No |
| . . . | . . . |

Table 1 may be a two-column list. A first column lists a name of a specific page element, and a second column shows whether the page element can be scrolled. When a value of the second column of the page element is "Yes", the page element can be scrolled. When a value of the second column of the page element is "No", the page element cannot be scrolled. For example, the first row in Table 1 shows whether the map page 321 of the map application interface 310 shown in FIG. 3B can be scrolled. A name of the map page 321 is "scrollview_page", and a value of whether the map page 321 can be scrolled is "Yes". When the electronic device 100 queries Table 1, it may be learned that the map page 321 can be scrolled.

It should be noted that the foregoing method for determining the specified page that can be scrolled is only an example. The electronic device 100 may determine, by using methods, including but not limited to the foregoing methods, whether the first interface includes the specified page that can be scrolled.

After determining the specified page that can be scrolled, the electronic device 100 may obtain both a width and a height of a scrolling window. For example, the electronic device 100 may obtain a size of a main view area by using a view (view) tree. The main view area is the scrolling window.

S503: The electronic device 100 captures the first interface to obtain a target screenshot image.

After the electronic device 100 determines that the first interface does not include the specified page that can be scrolled, the electronic device 100 may directly capture all content of the first interface displayed by the electronic device 100, to obtain the target screenshot image.

Optionally, after capturing and obtaining all the content of the first interface, the electronic device 100 may cut off content outside the scrolling window, and a cropped image is the target screenshot image.

S504: The electronic device 100 captures a first part of the specified page displayed in the scrolling window, to obtain a corresponding partitioned screenshot image.

After the electronic device 100 determines that the first interface includes the specified page that can be scrolled, the electronic device 100 captures the first part of the specified page displayed in the window, to obtain the corresponding partitioned screenshot image. The electronic device 100 may perform a screenshot operation on the first interface, and then crop, based on a position of the scrolling window in the first interface, the first part of the specified page displayed in the scrolling window, to obtain the corresponding partitioned screenshot image.

S505: The electronic device 100 determines whether a first condition is met.

The electronic device 100 may determine whether the electronic device 100 meets the first condition. If the first condition is met, the electronic device 100 performs step S507. If the first condition is not met, the electronic device 100 performs step S506.

The first condition may be that the electronic device 100 receives a second input (for example, tapping) of a user. After receiving the second input of the user, the electronic device 100 performs step S507 in response to the second input.

Alternatively, the first condition may be that a quantity of times of screen capturing by the electronic device 100 reaches a preset quantity of times. When the quantity of times of screen capturing by the electronic device 100 is greater than or equal to the preset quantity of times, the electronic device 100 performs step S507. When the quantity of times of screen capturing by the electronic device 100 is less than the preset quantity of times, the electronic device 100 performs step S506.

Alternatively, when the first interface includes two intersecting boundaries, the first condition may be that the scrolling window of the electronic device 100 scrolls a corner area of the specified page for display, and a part of the specified page that is captured by the electronic device 100 includes a surrounding part of the corner area. When the scrolling window of the electronic device 100 displays the corner area, the electronic device 100 performs step S507. When the scrolling window of the electronic device 100 does not display the corner area, the electronic device 100 performs step S506. The surrounding part of the corner area is captured by the electronic device 100.

Alternatively, the first condition may be that displayed content of the scrolling window in next scrolling of the electronic device 100 does not include valid content. If the electronic device 100 determines that the displayed content in the scrolling window in next scrolling does not include valid content, the electronic device 100 performs step S507. When the electronic device 100 determines that the displayed content in the scrolling window in next scrolling includes valid content, the electronic device 100 performs step S506.

Further, to obtain a target screenshot image that does not include a gap area, the first condition may be that the second input of the user is received and a plurality of captured parts of the specified page completely cover the specified area, or that the quantity of times of screen capturing reaches the preset quantity of times, and a plurality of captured parts of the specified page completely cover the specified area, or that the electronic device 100 determines that displayed content in the scrolling window in next scrolling does not include valid content, and a plurality of captured parts of the specified page completely cover the specified area. This can ensure that a final target screenshot image is a rectangle with a regular edge.

S506: The electronic device 100 controls, based on a preset trajectory direction, the specified page to move by a preset distance, displays another part of the specified page in the scrolling window, and captures displayed content in the scrolling window.

In some possible embodiments, the electronic device 100 may first capture a screenshot of the interface (the first interface) currently displayed by the electronic device 100, to obtain an image including all content of the interface currently displayed by the electronic device 100. Then, the electronic device 100 may obtain, by cropping the image including all the content of the currently displayed interface of the electronic device 100 based on position information of the scrolling window in the currently displayed interface, a part of the specified page in the scrolling window, to obtain a corresponding partitioned screenshot image.

That the electronic device 100 controls, based on a preset trajectory direction, the specified page to move by a preset distance is specifically: When a preset direction is moving upward/downward, the movement distance is a preset length. When a preset direction is moving leftward/rightward, the movement distance is a preset width. Formulas for calculating the preset length and the preset width are:

$$\text{Preset length} = \text{length of a scrolling window} - \text{preset length offset value}$$

$$\text{Preset width} = \text{length of a scrolling window} - \text{preset width offset value}$$

The preset length offset value and the preset width offset value are rational numbers greater than or equal to zero.

It should be noted that, when the first interface is an interface with a boundary, and the scrolling window scrolls an area near a boundary of the specified page for display, an actual movement distance that the specified page moves upward/downward is less than or equal to the preset length, and an actual movement distance that the specified page move leftward/rightward is less than or equal to the preset width.

To be specific, if a distance between an edge of the part of the specified page displayed in the scrolling window in a specified direction and a boundary of the specified page in the specified direction is greater than the preset length/width, the specified page moves by the preset width in a reverse direction of the specified direction. If a distance between an edge of the part of the specified page displayed in the scrolling window in a specified direction and a boundary of the specified page in the specified direction is less than the preset length/width, and the distance is greater than zero, the specified page moves in a reverse direction of the specified direction until a boundary of the scrolling window in the specified direction overlaps the boundary of the specified page in the specified direction. A movement distance of the specified page is less than the preset length/width. If a distance between an edge of the part of the specified page displayed in the scrolling window in a specified direction and a boundary of the specified page in the specified direction is equal to zero, the specified page cannot move in a reverse direction of the specified direction, and the electronic device 100 may determine, in a direction other than the reverse direction of the specified direction, a direction of an area that the scrolling window does not pass through in the specified page, and move in the direction.

The following describes an example diagram of a preset trajectory provided in an embodiment of this application with reference to FIG. 6.

For example, as shown in FIG. 6, when the first interface is an interface without a boundary, the preset trajectory may be shown by (a) to (c) in a block (1) shown in FIG. 6. The electronic device 100 first captures page content currently displayed in the scrolling window, for example, a black block in (a) in the block (1) in FIG. 6. Then, the electronic device 100 may sequentially capture, based on preset trajectory directions, content of an area circled around an area shown by the black block, as shown by a gray block in (b) in the block (1) in FIG. 6. For example, the electronic device 100 may control the specified page to sequentially scroll based on the preset trajectory directions, so that the scrolling window is sequentially displayed in corresponding positions relative to the specified page in the figure based on a dashed arrow in the figure. For example, the electronic device 100 may first control the specified page to slide downward. In this case, a preset trajectory direction is downward. The scrolling window of the electronic device 100 displays the gray block part above the black block on the specified page. The scrolling window is located in the gray block above the black block relative to the specified page. Then, the electronic device 100 may control the specified page to slide rightward. In this case, a preset trajectory direction is rightward. The scrolling window of the electronic device 100 displays the gray block part of the specified page in an upper left corner of the black block. The scrolling window is located in the gray block in the upper left corner of the black box relative to the specified page. The rest may be deduced by analogy.

Then, after the electronic device 100 captures the gray block part on the specified page, the electronic device 100 may circle content of a white block area outside a gray block area, as shown in (c) in the block (1) in FIG. 6. The rest may be deduced by analogy. For example, for a preset trajectory of a scrolling screenshot operation performed by the electronic device 100 on the file application interface 400 shown in FIG. 4A, refer to the block (1) in FIG. 6.

When the first interface is an interface with one boundary, the preset trajectory may be shown by (a) to (c) in a block (2) shown in FIG. 6. The electronic device 100 first captures page content currently displayed in the scrolling window, as shown by a black block in (a) of the block (2) in FIG. 6. Then, the electronic device 100 may capture content of a gray block area circled around a black block area, as shown in (b) of the block (2) in FIG. 6. Then, the electronic device 100 may circle content of a white area outside the gray block area, as shown in (c) of the block (2) in FIG. 6. The rest may be deduced by analogy. Because the black block is adjacent to a boundary, the electronic device 100 subsequently captures around the black block and close to the boundary. For example, the electronic device 100 may control the specified page to sequentially scroll based on the preset trajectory directions, so that the scrolling window is sequentially displayed in corresponding positions relative to the specified page in the figure based on a dashed arrow in the figure.

When the first interface is an interface with two adjacent boundaries, the preset trajectory may be shown by (a) to (c) in a block (3) shown in FIG. 6. The electronic device 100 first captures page content currently displayed in the scrolling window, for example, a black block in (a) of the block (3) in FIG. 6. Then, the electronic device 100 may capture content of a gray block area circled around a black block area, as shown in (b) of the block (3) in FIG. 6. Then, the electronic device 100 may circle content of a white block area outside a gray block area, as shown in (c) in the block (3) in FIG. 6. The rest may be deduced by analogy. Because the black block is adjacent to two boundaries, the electronic device 100 subsequently performs a scrolling capture operation around the black block and close to the boundaries. For example, the electronic device 100 may control the specified page to sequentially scroll based on the preset trajectory directions, so that the scrolling window is sequentially displayed in corresponding positions relative to the specified page in the figure based on a dashed arrow in the figure.

S507: The electronic device 100 obtains a target screenshot image by splicing all partitioned screenshot images.

After determining that the first condition is met, the electronic device 100 may perform splicing based on a plurality of captured partitioned screenshot images, to obtain the target screenshot image.

For example, the electronic device 100 may obtain a repeated area of the plurality of partitioned screenshot images based on a length and a width of each movement of the scrolling window, a length and a width of the scrolling window, and the preset trajectory. The electronic device 100 may cut off redundant content of the repeated area in the partitioned screenshot images, and splice, based on the preset trajectory, the plurality of cropped partitioned screenshot images, to obtain the target screenshot image. Alternatively, the electronic device 100 may further obtain a repeated area by comparing pixels of adjacent multi-frame split-screen screenshot images. Optionally, the electronic device 100 may directly place the plurality of partitioned screenshot images in an overlapping manner based on an area in which each frame of image is located in the preset trajectory, to obtain the target screenshot image.

Optionally, both the preset length offset value and the preset width offset value of the electronic device 100 are zero. To be specific, the preset length is the same as the length of the scrolling window, and the preset width is the same as the width of the scrolling window. Then, the electronic device 100 may directly splice based on relative positions of the plurality of partitioned screenshot images to obtain the target screenshot image.

S508: The electronic device 100 displays the target screenshot image.

The electronic device 100 may display the obtained target screenshot image on a display. For example, a screenshot display interface 440 shown in FIG. 4I-1 is shown.

Optionally, the electronic device 100 may not display the target screenshot image, but directly save the obtained target screenshot image to a gallery.

Figure 7:
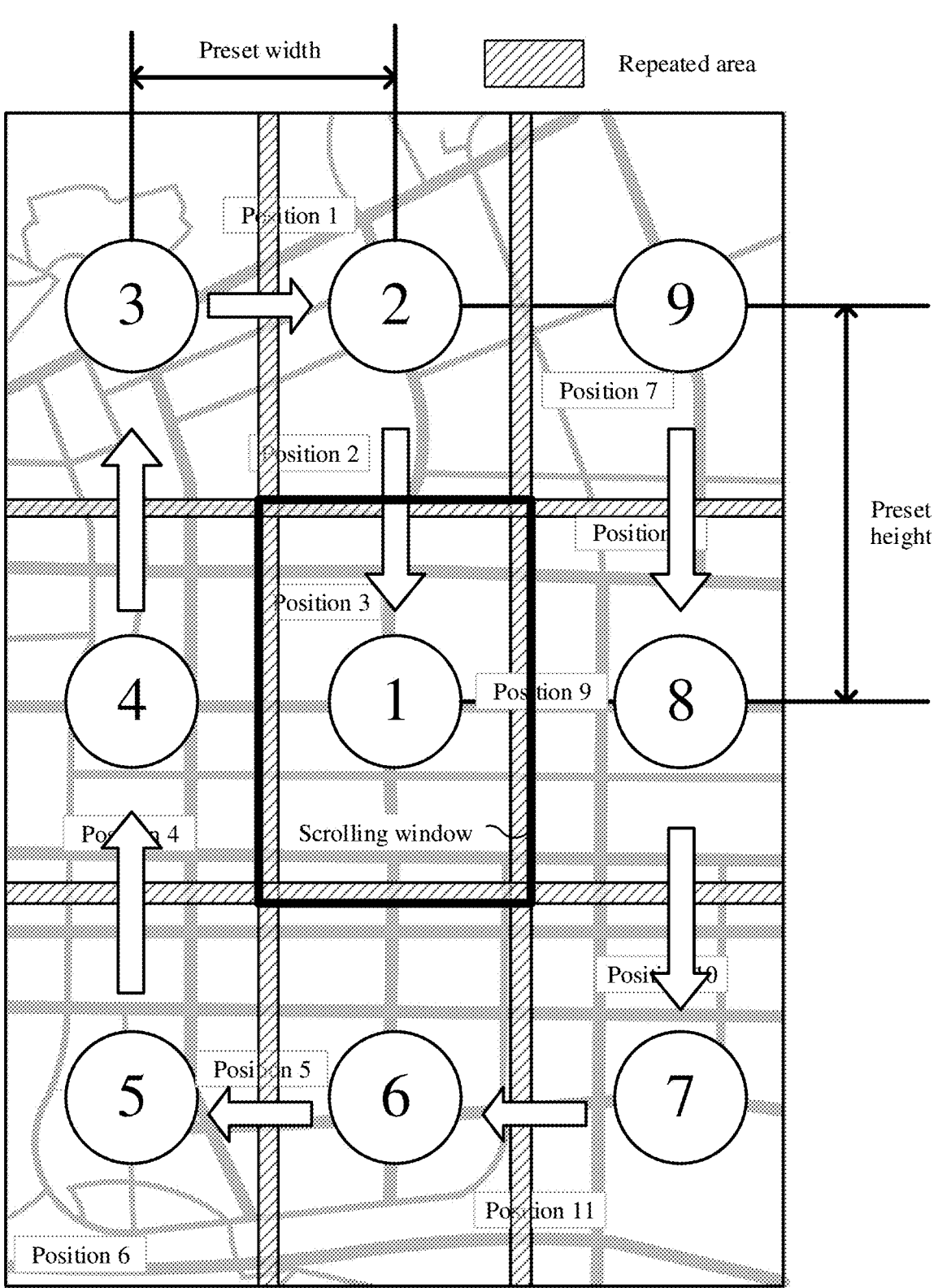
FIG. 7 is a step diagram of a scrolling screenshot method according to an embodiment of this application.

The following describes specific implementation steps of the scrolling screenshot operation of the electronic device 100 with reference to FIG. 7. Herein, the map application interface 310 shown in FIG. 3C is used as the first interface for description.

As shown in FIG. 7, after receiving the first input of the user for the map page 321 shown in FIG. 3C, the electronic device 100 may substantially move, based on number marks shown in FIG. 7, the specified page in a direction indicated by an arrow. The direction indicated by the arrow in the figure is a preset trajectory direction.

When the scrolling window displays a mark 1 area (as shown in FIG. 3C) of the specified page, the electronic device 100 first captures content of the mark 1 area (the first part of the map page 321), to obtain a partitioned screenshot image that includes the first part of the map page 321.

Then, the electronic device 100 may control the specified page to move based on a preset trajectory direction, and scroll a mark 2 area (as shown in FIG. 3D) in the scrolling window for display. The preset trajectory direction herein is an arrow direction, namely, downward, from the mark 2 area to the mark 1 area in the figure. The electronic device 100 may capture content of the mark 2 area (the second part of the map page 321), to obtain a partitioned screenshot image that includes the second part of the map page 321. The mark 1 area is adjacent to the mark 2 area.

Then, the electronic device 100 may control the specified page to move based on a preset trajectory direction, and scroll a mark 3 area (as shown in FIG. 3E) in the scrolling window for display. The preset trajectory direction herein is an arrow direction, namely, rightward, from the mark 3 area to the mark 2 area. The electronic device 100 may capture content of the mark 3 area (the third part of the map page 321), to obtain a partitioned screenshot image that includes the third part of the map page 321.

The preset trajectory direction herein may be shown by the arrow in the figure. Finally, the mark 1 area to a mark 9 area in the scrolling window may be sequentially scrolled for display, and content displayed in the scrolling window is captured, to obtain corresponding partitioned screenshot images.

The electronic device 100 may record a distance (which may mean the preset width and the preset height herein) of each movement of the specified page. The electronic device 100 may determine a size and a position of a repeated area by using the movement distance and a size of the scrolling window, as shown by a diagonal area in the figure.

After each movement of the specified page and a corresponding partitioned screenshot image is captured, the electronic device 100 may calculate the repeated area of a newly obtained partitioned screenshot image relative to a captured partitioned screenshot image. The electronic device 100 may cut off the repeated area of the newly obtained partitioned screenshot image, and splice a cropped image and a previous partitioned screenshot image. For example, after obtaining a partitioned screenshot image corresponding to the mark 2 area, the electronic device 100 may cut off a repeated area of the partitioned screenshot image of the mark 2 area relative to the lower mark area 1, and splice a lower part of the cropped partitioned screenshot image of the mark 2 area and an upper part of a partitioned screenshot image of the mark 1 area, to obtain a spliced image 1. Then, the electronic device 100 may scroll the mark area 3 for display. After obtaining a partitioned screenshot image corresponding to the mark area 3, the electronic device 100 may cut off a repeated area of the partitioned screenshot image of the mark area 3 relative to the spliced image 1, and splice a right part of the cropped partitioned screenshot image of the mark area 3 to a left part of the mark area 2 in the spliced image 1, to obtain a spliced image 2. The rest operations are similar. Finally, the electronic device 100 may obtain a target screenshot image including the mark 1 area to the mark 9 area.

Optionally, the electronic device 100 may start a splicing operation only after obtaining all partitioned screenshot images.

Optionally, when both the preset length offset value and the preset width offset value in the electronic device 100 are zero, there is no repeated area between partitioned screenshot images, and splicing may be directly performed.

In this case, the electronic device 100 may obtain a screenshot image of the specified display area of the multi-directional interface.

In a possible implementation, to further ensure that the obtained target screenshot image does not include a gap area (namely, an area without specified page content), the electronic device 100 may control, after the first condition is met, the specified page to move by a preset distance in a verification direction, and capture content of the specified page displayed in the scrolling window, to obtain a verification image. The electronic device 100 may compare the verification image with the partitioned screenshot image captured by the electronic device 100 at a corresponding position. If content of the two images is the same, the electronic device stops scrolling and capturing the displayed content in the scrolling window, to obtain the target screenshot image. If content of the two images is different, the electronic device returns to specified page content initially displayed by the electronic device 100, and captures the content of the specified page displayed in the scrolling window. The verification direction is a direction that is perpendicular to the preset trajectory direction and that points to specified page content that is not captured.

If the verification direction is leftward/rightward, a movement distance of the specified page is the preset width. If the verification direction is upward/downward, a movement distance of the specified page is the preset length.

Optionally, after determining that the content of the two images is the same, the electronic device 100 may further move the specified page to a position located before the specified page moves in the verification direction.

Optionally, the process of determining whether the target screenshot image includes the gap area may not be displayed on the display of the electronic device 100.

This can further ensure that the target screenshot image obtained by the electronic device 100 does not include the gap area.

The following describes a procedure of a scrolling screenshot method provided in an embodiment of this application.

When the first interface is an interface with two adjacent boundaries, the preset trajectory may be shown by (a) to (c) in a block (3) shown in FIG. 6. The electronic device 100 first captures page content currently displayed in the scrolling window, for example, a black block in (a) of the block (3) in FIG. 6. Then, the electronic device 100 may capture content of a gray block area circled around a black block area, as shown in (b) of the block (3) in FIG. 6. Then, the electronic device 100 may circle content of a white block area outside a gray block area, as shown in (c) in the block (3) in FIG. 6. The rest may be deduced by analogy. Because the black block is adjacent to two boundaries, the electronic device 100 subsequently performs a scrolling capture operation around the black block and close to the boundaries. For example, the electronic device 100 may control the specified page to sequentially scroll based on the preset trajectory directions, so that the scrolling window is sequentially displayed in corresponding positions relative to the specified page in the figure based on a dashed arrow in the figure.

S507: The electronic device 100 obtains a target screenshot image by splicing all partitioned screenshot images.

After determining that the first condition is met, the electronic device 100 may perform splicing based on a plurality of captured partitioned screenshot images, to obtain the target screenshot image.

For example, the electronic device 100 may obtain a repeated area of the plurality of partitioned screenshot images based on a length and a width of each movement of the scrolling window, a length and a width of the scrolling window, and the preset trajectory. The electronic device 100 may cut off redundant content of the repeated area in the partitioned screenshot images, and splice, based on the preset trajectory, the plurality of cropped partitioned screenshot images, to obtain the target screenshot image. Alternatively, the electronic device 100 may further obtain a repeated area by comparing pixels of adjacent multi-frame split-screen screenshot images. Optionally, the electronic device 100 may directly place the plurality of partitioned screenshot images in an overlapping manner based on an area in which each frame of image is located in the preset trajectory, to obtain the target screenshot image.

Optionally, both the preset length offset value and the preset width offset value of the electronic device 100 are zero. To be specific, the preset length is the same as the length of the scrolling window, and the preset width is the same as the width of the scrolling window. Then, the electronic device 100 may directly splice based on relative positions of the plurality of partitioned screenshot images to obtain the target screenshot image.

S508: The electronic device 100 displays the target screenshot image.

The electronic device 100 may display the obtained target screenshot image on a display. For example, a screenshot display interface 440 shown in FIG. 4I-1 is shown.

Optionally, the electronic device 100 may not display the target screenshot image, but directly save the obtained target screenshot image to a gallery.

The following describes specific implementation steps of the scrolling screenshot operation of the electronic device 100 with reference to FIG. 7. Herein, the map application interface 310 shown in FIG. 3C is used as the first interface for description.

As shown in FIG. 7, after receiving the first input of the user for the map page 321 shown in FIG. 3C, the electronic device 100 may substantially move, based on number marks shown in FIG. 7, the specified page in a direction indicated by an arrow. The direction indicated by the arrow in the figure is a preset trajectory direction.

When the scrolling window displays a mark 1 area (as shown in FIG. 3C) of the specified page, the electronic device 100 first captures content of the mark 1 area (the first part of the map page 321), to obtain a partitioned screenshot image that includes the first part of the map page 321.

Then, the electronic device 100 may control the specified page to move based on a preset trajectory direction, and scroll a mark 2 area (as shown in FIG. 3D) in the scrolling window for display. The preset trajectory direction herein is an arrow direction, namely, downward, from the mark 2 area to the mark 1 area in the figure. The electronic device 100 may capture content of the mark 2 area (the second part of the map page 321), to obtain a partitioned screenshot image that includes the second part of the map page 321. The mark 1 area is adjacent to the mark 2 area.

Then, the electronic device 100 may control the specified page to move based on a preset trajectory direction, and scroll a mark 3 area (as shown in FIG. 3E) in the scrolling window for display. The preset trajectory direction herein is an arrow direction, namely, rightward, from the mark 3 area to the mark 2 area. The electronic device 100 may capture content of the mark 3 area (the third part of the map page 321), to obtain a partitioned screenshot image that includes the third part of the map page 321.

The preset trajectory direction herein may be shown by the arrow in the figure. Finally, the mark 1 area to a mark 9 area in the scrolling window may be sequentially scrolled for display, and content displayed in the scrolling window is captured, to obtain corresponding partitioned screenshot images.

The electronic device 100 may record a distance (which may mean the preset width and the preset height herein) of each movement of the specified page. The electronic device 100 may determine a size and a position of a repeated area by using the movement distance and a size of the scrolling window, as shown by a diagonal area in the figure.

After each movement of the specified page and a corresponding partitioned screenshot image is captured, the electronic device 100 may calculate the repeated area of a newly obtained partitioned screenshot image relative to a captured partitioned screenshot image. The electronic device 100 may cut off the repeated area of the newly obtained partitioned screenshot image, and splice a cropped image and a previous partitioned screenshot image. For example, after obtaining a partitioned screenshot image corresponding to the mark 2 area, the electronic device 100 may cut off a repeated area of the partitioned screenshot image of the mark 2 area relative to the lower mark area 1, and splice a lower part of the cropped partitioned screenshot image of the mark 2 area and an upper part of a partitioned screenshot image of the mark 1 area, to obtain a spliced image 1. Then, the electronic device 100 may scroll the mark area 3 for display. After obtaining a partitioned screenshot image corresponding to the mark area 3, the electronic device 100 may cut off a repeated area of the partitioned screenshot image of the mark area 3 relative to the spliced image 1, and splice a right part of the cropped partitioned screenshot image of the mark area 3 to a left part of the mark area 2 in the spliced image 1, to obtain a spliced image 2. The rest operations are similar. Finally, the electronic device 100 may obtain a target screenshot image including the mark 1 area to the mark 9 area.

Optionally, the electronic device 100 may start a splicing operation only after obtaining all partitioned screenshot images.

Optionally, when both the preset length offset value and the preset width offset value in the electronic device 100 are zero, there is no repeated area between partitioned screenshot images, and splicing may be directly performed.

In this case, the electronic device 100 may obtain a screenshot image of the specified display area of the multidirectional interface.

In a possible implementation, to further ensure that the obtained target screenshot image does not include a gap area (namely, an area without specified page content), the electronic device 100 may control, after the first condition is met, the specified page to move by a preset distance in a verification direction, and capture content of the specified page displayed in the scrolling window, to obtain a verification image. The electronic device 100 may compare the verification image with the partitioned screenshot image captured by the electronic device 100 at a corresponding position. If content of the two images is the same, the electronic device stops scrolling and capturing the displayed content in the scrolling window, to obtain the target screenshot image. If content of the two images is different, the electronic device returns to specified page content initially displayed by the electronic device 100, and captures the content of the specified page displayed in the scrolling window. The verification direction is a direction that is perpendicular to the preset trajectory direction and that points to specified page content that is not captured.

If the verification direction is leftward/rightward, a movement distance of the specified page is the preset width. If the verification direction is upward/downward, a movement distance of the specified page is the preset length.

Optionally, after determining that the content of the two images is the same, the electronic device 100 may further move the specified page to a position located before the specified page moves in the verification direction.

Optionally, the process of determining whether the target screenshot image includes the gap area may not be displayed on the display of the electronic device 100.

This can further ensure that the target screenshot image obtained by the electronic device 100 does not include the gap area.

The following describes a procedure of a scrolling screenshot method provided in an embodiment of this application.

What is claimed is:

1. A scrolling screenshot method, comprising: displaying, by an electronic device, a first interface, wherein the first interface displays a first part of a first page; receiving, by the electronic device, a first input; capturing, by the electronic device, the first part of the first page in response to the first input; scrolling, by the electronic device in a first direction for display, and capturing a second part of the first page, wherein the first part is adjacent to the second part; scrolling, after the electronic device captures the second part, by the electronic device, in a second direction, for display, and capturing a third part of the first page, wherein the second direction is different from the first direction; determining, by the electronic device, that a first condition is met; and synthesizing, by the electronic device, a target screenshot image in response to determining that the first condition is met, wherein the target screenshot image comprises the first part, the second part, and the third part, wherein the first condition comprises: the electronic device displaying a corner area of the first page in a scrolling window, or the electronic device determining that a plurality of captured parts of the first page completely covers a specified area.

2. The method according to claim 1, wherein the first condition comprises the electronic device receiving an operation of stopping screen capturing.

3. The method according to claim 1, wherein the first condition comprises the electronic device displaying a corner area of the first page in a scrolling window, and further comprises a part that has been captured by the electronic device on the first page comprising a surrounding part of the corner area.

4. The method according to claim 1, wherein the method further comprises performing, before the determining that the first condition is met:

scrolling, by the electronic device, a fourth part of the first page in a third direction for display, wherein the first condition comprises the electronic device determining that the fourth part of the first page does not comprise valid content.

5. The method according to claim 2, wherein the first condition comprises the electronic device determining that a plurality of captured parts of the first page completely covers a specified area, wherein the plurality of parts of the first page comprises the first part, the second part, and the third part, and wherein the specified area is a smallest rectangular area that has a regular edge and includes the plurality of parts of the first page that have been captured by the electronic device.

6. An electronic device, comprising:

one or more processors; a display; and one or more memories, wherein the display and the one or more memories are coupled to the one or more processors, the one or more memories store computer program code, the computer program code comprises computer instructions that, when executed by the one or more processors, enable the electronic device to:

display a first interface, wherein the first interface displays a first part of a first page;

receive a first input;

capture the first part of the first page in response to the first input;

scroll in a first direction for display, and capture a second part of the first page, wherein the first part is adjacent to the second part;

scroll in a second direction for display after the electronic device captures the second part, and capture a third part of the first page, wherein the second direction is different from the first direction; and determine that a first condition is met; and synthesize a target screenshot image in response to determining that the first condition is met, wherein the target screenshot image comprises the first part, the second part, and the third part, wherein the first condition comprises: the electronic device displaying a corner area of the first page in a scrolling window, or the electronic device determining that a plurality of captured parts of the first page completely covers a specified area.

7. The electronic device according to claim 6, wherein the first condition comprises the electronic device receiving an operation of stopping screen capturing.

8. The electronic device according to claim 7, wherein the first condition comprises the electronic device determining that a plurality of captured parts of the first page completely covers a specified area, wherein the plurality of parts of the first page comprises the first part, the second part, and the third part, and wherein the specified area is a smallest rectangular area that has a regular edge and includes the plurality of parts of the first page that have been captured by the electronic device.

9. The electronic device according to claim 6, wherein the first condition comprises a quantity of times of screen capturing by the electronic device being greater than or equal to a preset quantity of times.

10. The electronic device according to claim 6, wherein the first condition comprises the electronic device displaying a corner area of the first page in a scrolling window, and further comprises a part that has been captured by the electronic device on the first page comprising a surrounding part of the corner area.

11. The electronic device according to claim 6, wherein the electronic device is further enabled to perform, before the electronic device determines that the first condition is met;

scroll a fourth part of the first page in a third direction for display, wherein the first condition comprises the electronic device determining that the fourth part of the first page does not comprise valid content.

12. A non-transitory computer-readable storage medium, comprising instructions, wherein when the instructions are run on an electronic device, the electronic device is enabled to:

display a first interface, wherein the first interface displays a first part of a first page;

receive a first input;

capture the first part of the first page in response to the first input;

scroll in a first direction for display, and capture a second part of the first page, wherein the first part is adjacent to the second part;

scroll in a second direction for display after the electronic device captures the second part, and capture a third part of the first page, wherein the second direction is different from the first direction;

determine that a first condition is met; and synthesize a target screenshot image in response to determining that the first condition is met, wherein the target screenshot image comprises the first part, the second part, and the third part, wherein the first condition comprises: the electronic device displaying a corner area of the first page in a scrolling window, or the electronic device determining that a plurality of captured parts of the first page completely covers a specified area.

13. The non-transitory computer-readable storage medium according to claim 12, wherein the first condition comprises the electronic device receiving an operation of stopping screen capturing.

14. The non-transitory computer-readable storage medium according to claim 13, wherein the first condition comprises the electronic device determining that a plurality of captured parts of the first page completely cover a specified area, wherein the plurality of parts of the first page comprise the first part, the second part, and the third part, and the specified area is a smallest rectangular area that has a regular edge and includes the plurality of parts of the first page that have been captured by the electronic device.

15. The non-transitory computer-readable storage medium according to claim 12, wherein the first condition comprises a quantity of times of screen capturing by the electronic device being greater than or equal to a preset quantity of times.

16. The non-transitory computer-readable storage medium according to claim 12, wherein the first condition comprises the electronic device displaying a corner area of the first page in a scrolling window, and a part that has been captured by the electronic device on the first page comprises a surrounding part of the corner area.

17. The non-transitory computer-readable storage medium according to claim 12, wherein the electronic device is further enabled to perform, before the electronic device determines that the first condition is met;

scroll a fourth part of the first page in a third direction for display; and wherein the first condition comprises the electronic device determining that the fourth part of the first page does not comprise valid content.

\* \* \* \* \*